US008830568B2

(12) United States Patent
Savage-Leuchs et al.

(10) Patent No.: US 8,830,568 B2
(45) Date of Patent: Sep. 9, 2014

(54) HIGH BEAM QUALITY AND HIGH AVERAGE POWER FROM LARGE-CORE-SIZE OPTICAL-FIBER AMPLIFIERS

(75) Inventors: Matthias P. Savage-Leuchs, Woodinville, WA (US); Christian E. Dilley, Everett, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 701 days.

(21) Appl. No.: 13/085,411

(22) Filed: Apr. 12, 2011

(65) Prior Publication Data

US 2011/0249320 A1 Oct. 13, 2011

Related U.S. Application Data

(60) Provisional application No. 61/343,948, filed on Apr. 12, 2010.

(51) Int. Cl.
*H01S 3/091* (2006.01)
(52) U.S. Cl.
USPC .................................. 359/341.3; 359/341.33
(58) Field of Classification Search
USPC .............................. 372/70; 359/341.3, 341.33
See application file for complete search history.

(56) References Cited

U.S. PATENT DOCUMENTS

| 3,823,997 | A | 7/1974 | Gloge et al. |
| 4,176,911 | A | 12/1979 | Marcatili et al. |
| 6,456,756 | B1 | 9/2002 | Mead et al. |
| 6,990,277 | B2 | 1/2006 | White |
| 7,199,924 | B1 | 4/2007 | Brown |
| 7,379,648 | B1 | 5/2008 | Brooks et al. |
| 7,386,211 | B1 | 6/2008 | Di Teodoro et al. |
| 7,391,561 | B2 | 6/2008 | Di Teodoro et al. |
| 7,400,804 | B1 | 7/2008 | Di Teodoro et al. |
| 7,429,734 | B1 | 9/2008 | Tidwell |
| 7,430,352 | B2 | 9/2008 | Di Teodoro et al. |
| 7,471,705 | B2 | 12/2008 | Gerstenberger et al. |
| 7,539,231 | B1 | 5/2009 | Honea et al. |

(Continued)

OTHER PUBLICATIONS

Varallyay, et al., "Comparison of amplification in large area fibers using cladding-pump and fundamental-mode core-pump schemes", "Optics Express", Sep. 14, 2009, pp. 17242-17252, vol. 17, No. 20.

*Primary Examiner* — Mark Hellner
(74) *Attorney, Agent, or Firm* — Charles A. Lemaire; Jonathan M. Rixen; Lemaire Patent Law Firm, P.L.L.C.

(57) ABSTRACT

In some embodiments, the present invention provides an apparatus, method and use for improving and merging two existing techniques (core pumping and cladding pumping) to enable high-power fiber-laser systems having excellent beam quality while using large-core (LMA) step-index gain fibers at very high optical power, wherein the core pumping includes mixing a laser seed optical signal (having a signal wavelength) with optical core-pump light (having a core-pump wavelength that is near the signal wavelength) in a manner that matches the modes of the seed optical signal and the pump light. The combined core light is mode matched to the LMA gain fiber. The core-pump light is substantially all absorbed within a short distance from the entry end of the gain fiber and provides a strong pre-amplified signal for later cladding-pumped amplification. In some embodiments, the signal wavelength and the core-pump wavelength are within a single multiplet of a rare-earth dopant.

21 Claims, 8 Drawing Sheets

(56) References Cited

U.S. PATENT DOCUMENTS

| | | |
|---|---|---|
| 7,620,077 B2 | 11/2009 | Henderson |
| 7,671,337 B1 | 3/2010 | Tidwell |
| 7,701,987 B1 | 4/2010 | Savage-Leuchs et al. |
| 7,768,700 B1 | 8/2010 | Savage-Leuchs |
| 7,792,166 B2 | 9/2010 | Borschowa |
| 7,872,794 B1 | 1/2011 | Minelly et al. |
| 8,611,003 B2 * | 12/2013 | Ahn et al. ............... 359/341.3 |
| 2005/0105854 A1 * | 5/2005 | Dong et al. ............... 385/46 |
| 2008/0077200 A1 | 3/2008 | Bendett et al. |
| 2008/0180787 A1 | 7/2008 | DiGiovanni |
| 2008/0219299 A1 * | 9/2008 | Lewis ............... 372/6 |

* cited by examiner

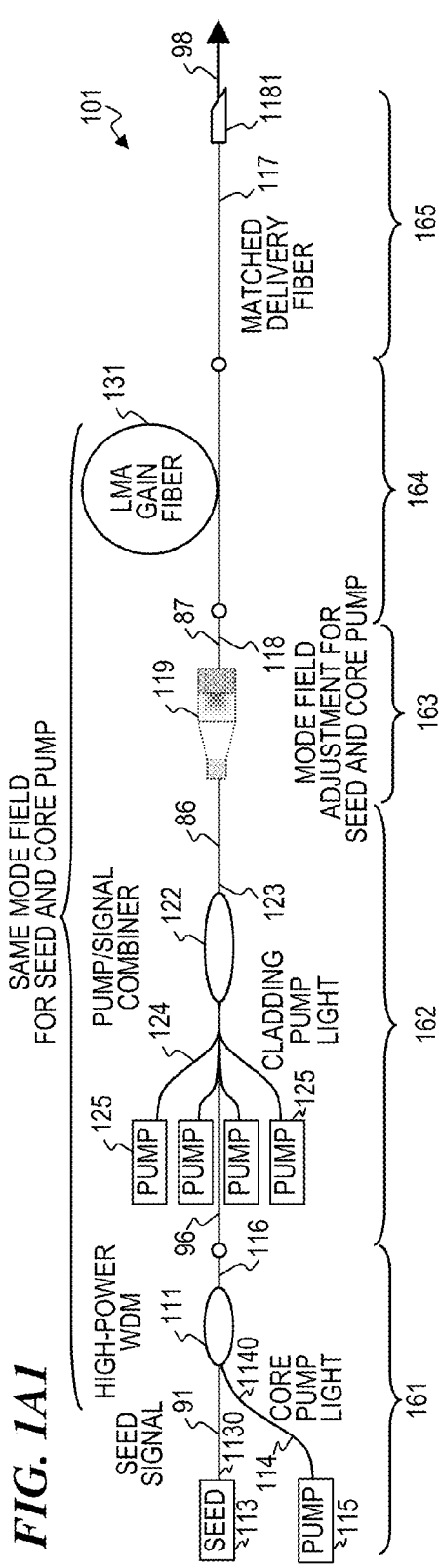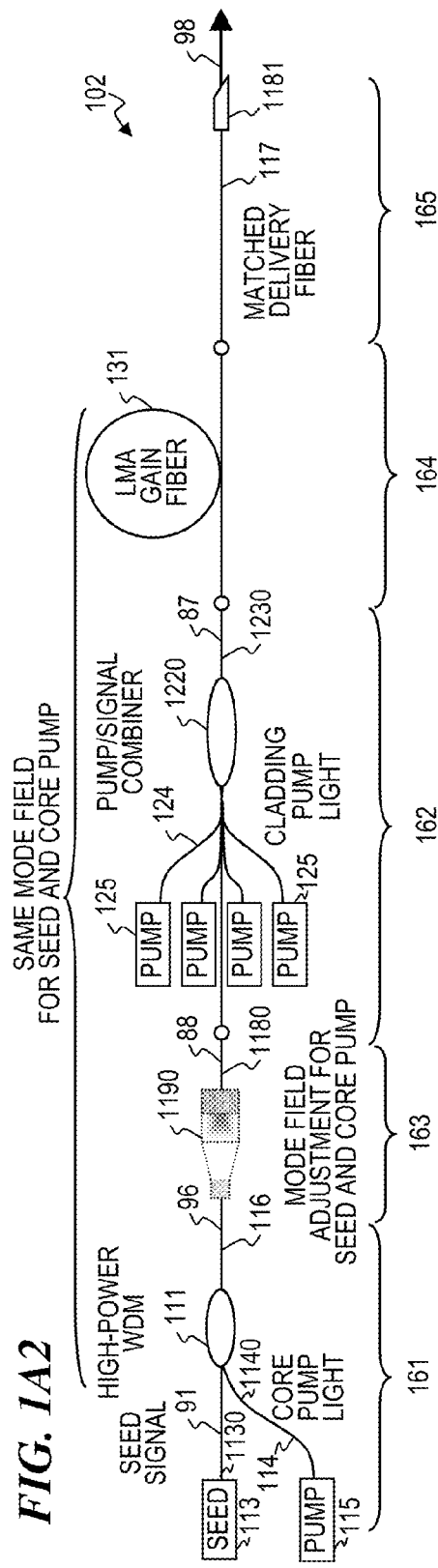

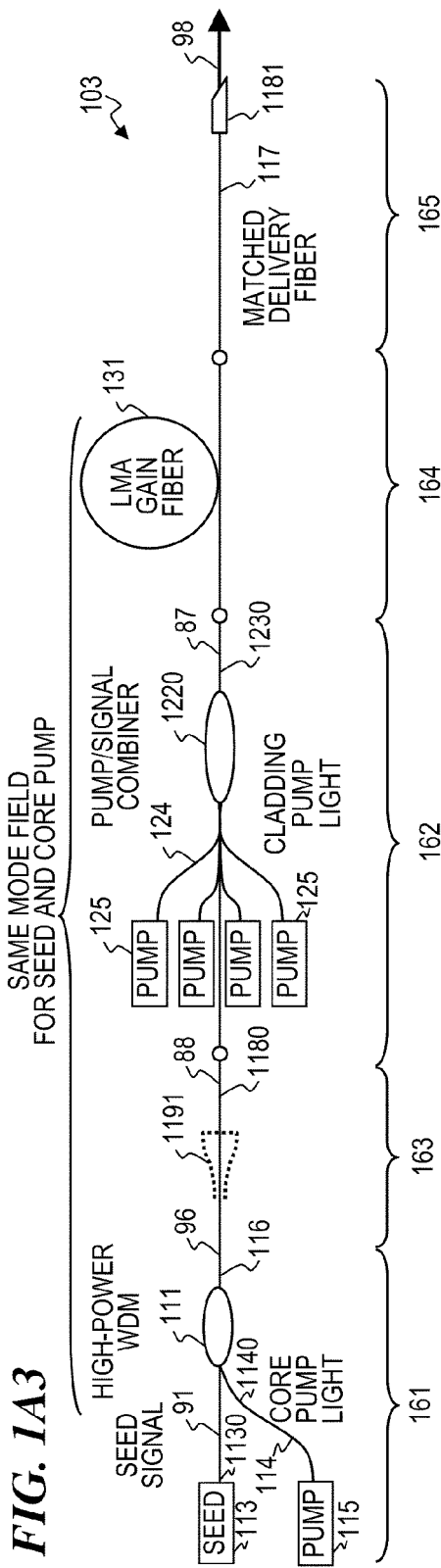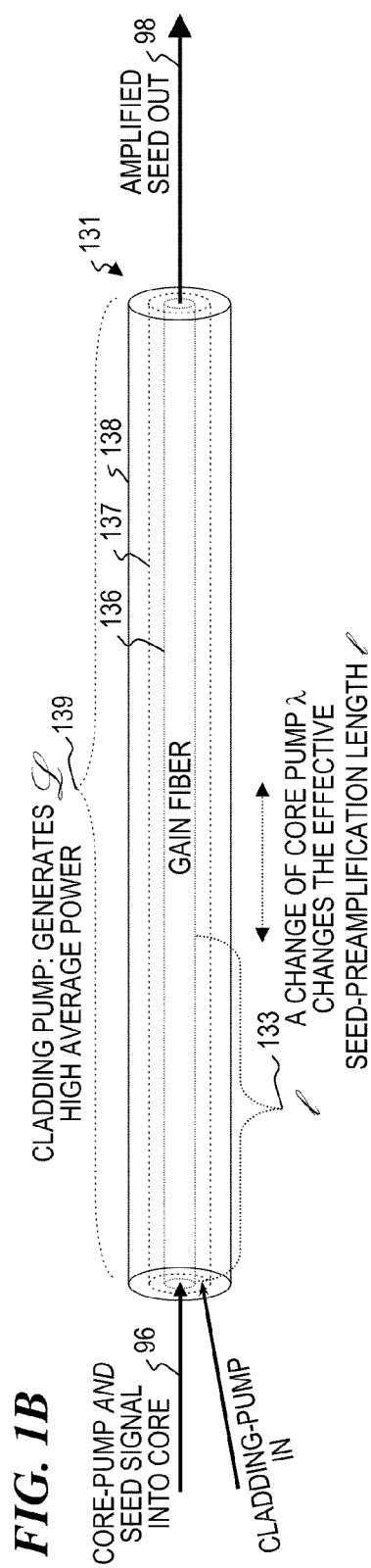

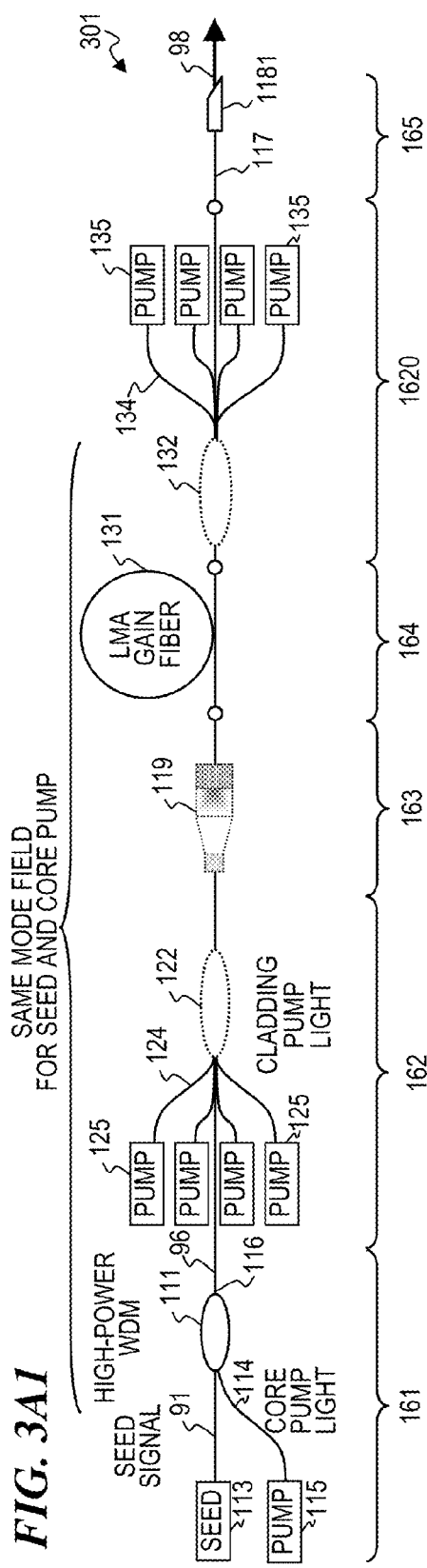
FIG. 3A1
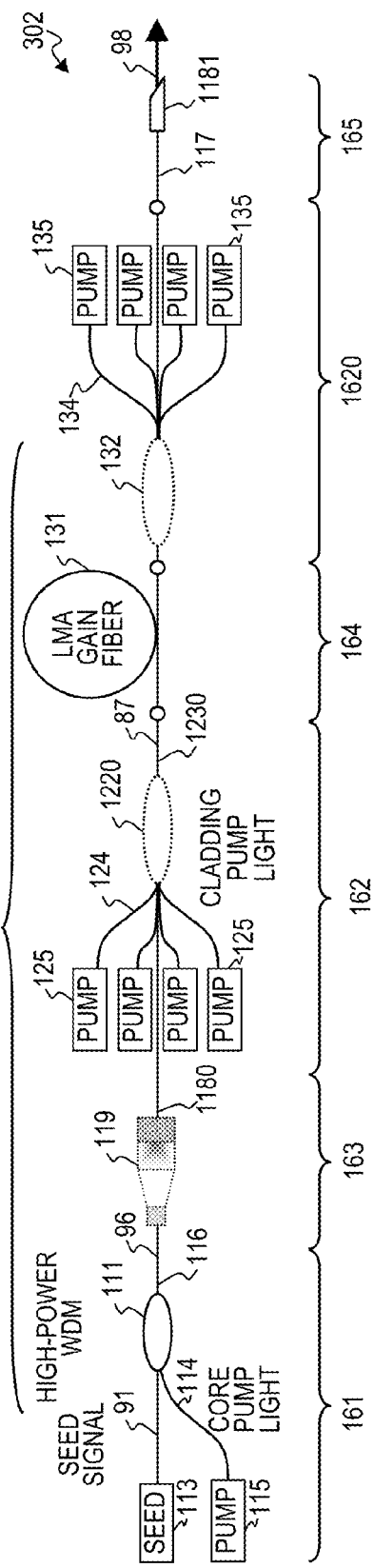
FIG. 3A2

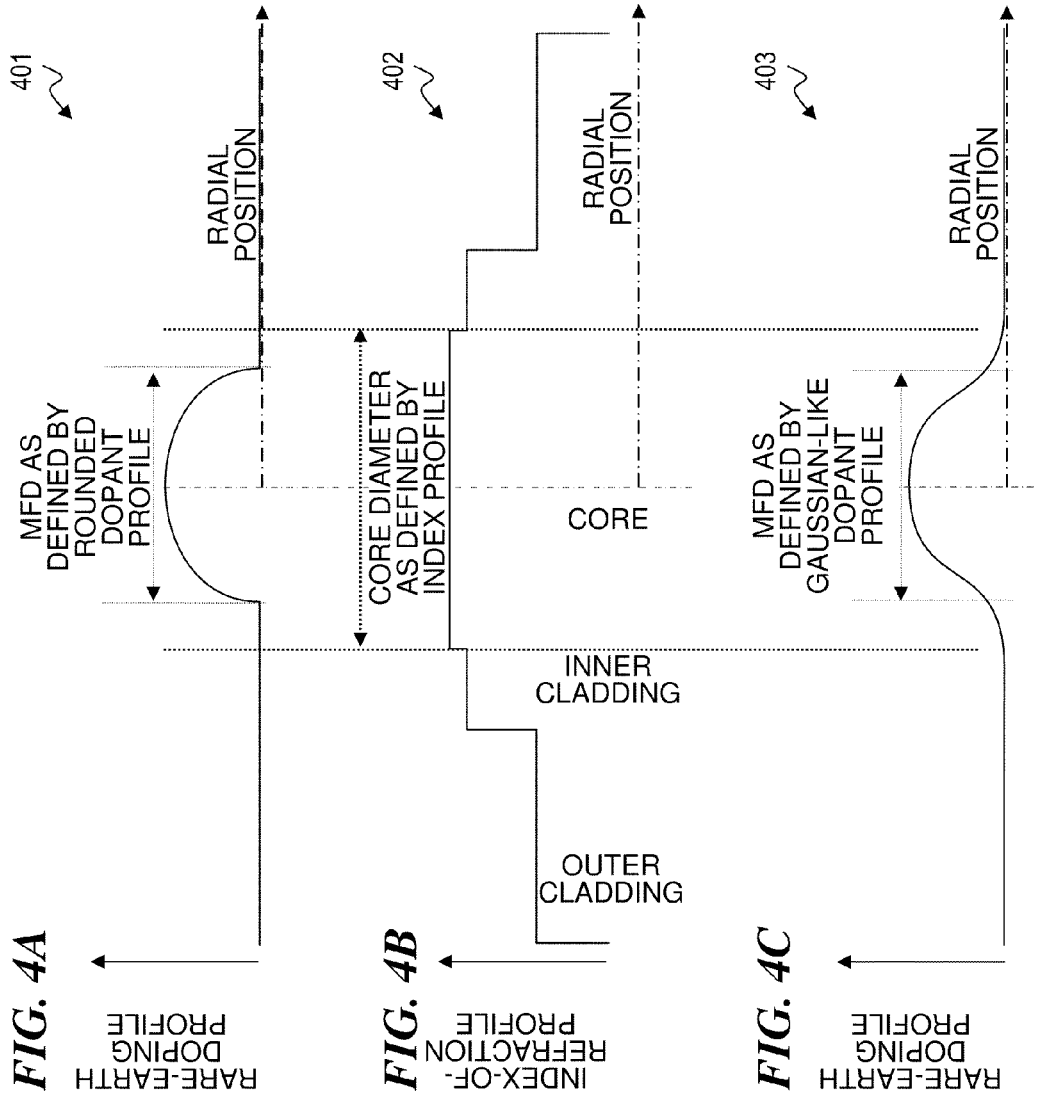

HIGH BEAM QUALITY AND HIGH AVERAGE POWER FROM LARGE-CORE-SIZE OPTICAL-FIBER AMPLIFIERS

CROSS-REFERENCE TO RELATED APPLICATIONS

This application claims priority benefit under 35 U.S.C. §119(e) to U.S. Provisional Patent Application 61/343,948 filed on Apr. 12, 2010, titled "SIGNAL AND PUMP MODE-FIELD ADAPTOR FOR DOUBLE-CLAD FIBERS AND ASSOCIATED METHOD" which is incorporated herein by reference in its entirety.

This invention is related to:

P.C.T. Patent Application PCT/US2011/031864 titled "HIGH BEAM QUALITY AND HIGH AVERAGE POWER FROM LARGE-CORE-SIZE OPTICAL-FIBER AMPLIFIERS" filed on Apr. 9, 2011 by Matthias P. Savage-Leuchs and Christian E. Dilley, P.C.T. Patent Application PCT/US2011/031863 titled "SIGNAL AND PUMP MODE-FIELD ADAPTOR FOR DOUBLE-CLAD FIBERS AND ASSOCIATED METHOD" filed Apr. 9, 2011 by Matthias P. Savage-Leuchs and Christian E. Dilley U.S. Pat. No. 6,456,756 to Roy Mead, et al. issued Sep. 24, 2002 titled "FIBER RAMAN AMPLIFIER PUMPED BY AN INCOHERENTLY BEAM COMBINED DIODE LASER,"

U.S. patent application Ser. No. 11/165,676 (which issued as U.S. Pat. No. 7,792,166 on Sep. 7, 2010) titled "APPARATUS AND METHOD FOR DRIVING LASER DIODES" filed Jun. 24, 2005 by Lawrence A. Borschowa, U.S. Pat. No. 7,620,077 titled "APPARATUS AND METHOD FOR PUMPING AND OPERATING OPTICAL PARAMETRIC OSCILLATORS USING DFB FIBER LASERS" that issued Nov. 17, 2009, U.S. Pat. No. 7,539,231 titled "APPARATUS AND METHOD FOR GENERATING CONTROLLED-LINEWIDTH LASER-SEED-SIGNALS FOR HIGH-POWERED FIBER-LASER AMPLIFIER SYSTEMS" that issued May 26, 2009 to Eric C. Honea et al., U.S. Pat. No. 7,701,987 to Matthias P. Savage-Leuchs et al. issued Apr. 20, 2010 titled "APPARATUS AND METHOD FOR GENERATING CHIRP-SLICE CONTROLLED-LINEWIDTH LASER-SEED SIGNALS", U.S. Pat. No. 7,471,705 titled "ULTRAVIOLET LASER SYSTEM AND METHOD HAVING WAVELENGTH IN THE 200-NM RANGE" that issued Dec. 30, 2008, U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" that issued Jun. 24, 2008, U.S. Pat. No. 7,430,352 titled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD" that issued Sep. 30, 2008, U.S. Pat. No. 7,379,648 titled "OPTICAL HOLLOW-CORE DELIVERY FIBER AND HOLLOW-ENDCAP TERMINATION AND ASSOCIATED METHOD" that issued May 27, 2008, U.S. Pat. No. 7,386,211 titled "METHOD AND APPARATUS FOR SPECTRAL-BEAM COMBINING OF MEGAWATT-PEAK-POWER BEAMS FROM PHOTONIC-CRYSTAL RODS," which issued Jun. 13, 2008, U.S. Pat. No. 7,400,804 titled "MONOLITHIC OR RIBBON-LIKE MULTI-CORE PHOTONIC-CRYSTAL FIBERS AND ASSOCIATED METHOD," which issued Jul. 15, 2008, U.S. Pat. No. 7,429,734 titled "SYSTEM AND METHOD FOR AIRCRAFT INFRARED COUNTERMEASURES TO MISSILES" that issued Sep. 30, 2008, U.S. Pat. No. 7,199,924 titled "APPARATUS AND METHOD FOR SPECTRAL-BEAM COMBINING OF HIGH-POWER FIBER LASERS," which issued on Apr. 3, 2007, U.S. Pat. No. 7,768,700 issued Aug. 3, 2010 to Matthias P. Savage-Leuchs, titled "METHOD AND APPARATUS FOR OPTICAL GAIN FIBER HAVING SEGMENTS OF DIFFERING CORE SIZES", U.S. Pat. No. 7,872,794 issued Jan. 18, 2011 to John D. Minelly et al., titled "HIGH-ENERGY EYE-SAFE PULSED FIBER AMPLIFIERS AND SOURCES OPERATING IN ERBIUM'S L-BAND", and U.S. patent application Ser. No. 12/624,327 (which issued as U.S. Pat. No. 8,441,718 on May 14, 2013) titled "SPECTRALLY BEAM COMBINED LASER SYSTEM AND METHOD AT EYE-SAFER WAVELENGTHS" filed Nov. 23, 2009 by Roy D. Mead, U.S. Provisional Patent Application 61/263,736 filed Nov. 23, 2009 by Matthias P. Savage-Leuchs et al., titled "Q-switched oscillator seed-source for MOPA laser illuminator method and apparatus", which are all incorporated herein in their entirety by reference.

FIELD OF THE INVENTION

The invention relates generally to optical waveguides and more particularly to systems using large-core-size optical-fiber gain media that obtain both high beam quality and high average power from high-power master-oscillator power-amplifier (MOPA) laser systems by combining resonant core pumping (e.g., in a fiber-preamplifier or high-power wavelength-division-multiplexor (WDM) stage) using with cladding pumping (e.g., in a fiber-power-amplifier stage).

BACKGROUND OF THE INVENTION

High-power fiber lasers require fibers having large core diameters and large mode-field diameters. Numerous methods exist to achieve good beam quality from large-core fibers; however, many of these so-called large-mode-area (LMA) fibers are difficult to make and are expensive.

A prime example of structures that achieve good beam quality from large-core fibers are photonic crystal fibers (PCFs). Such PCFs deliver excellent beam quality (which have been demonstrated only with optical signals at wavelengths of about one micron) in PCFs with large mode-field diameters (also called large mode-field area of large-mode-area (LMA) fibers); however, PCFs are extremely difficult to produce, difficult to cleave, and up to now impossible to fusion splice. Therefore, such fibers do not enable a true all-fiber assembly, which is very important when building highly robust laser systems.

In contrast, standard step-index fibers are simple to cleave and fusion splice and allow building of all-fiber laser systems. However, such fibers have typically degraded beam quality due to their high numerical aperture (NA), which is typically in the range of 0.15-0.22 (wherein NA is equal to the sine of the acceptance angle $\Theta_a$).

A gain-producing fiber (also called a "gain fiber" herein) is an optical fiber that includes one or more light-amplifying species, typically rare-earth dopants, which absorb and store energy from pump light (optical radiation), and then that absorbed stored energy amplifies an optical signal beam.

U.S. Patent Application Publication 2008/0180787 (which issued as U.S. Pat. No. 7,916,386 on Mar. 29, 2011) by DiGiovanni et al. was filed Jul. 31, 2008 titled "High power optical apparatus employing large-mode-area, multimode, gain-producing optical fibers," and is incorporated herein by reference. DiGiovanni et al. describe optical apparatus that includes a multimode, gain-producing fiber for providing gain to signal light propagating in the core of the fiber, and a pump source for providing pump light that is absorbed in the core, characterized in that (i) the pump source illustratively comprises a low brightness array of laser diodes and a converter for increasing the brightness of the pump light, (ii) the pump light is coupled directly into the core, and (iii) the area of the core exceeds approximately 350 µm$^2$. In one embodiment, the signal light propagates in a single mode, and the pump light co-propagates in at least the same, single mode, both in a standard input fiber before entering the gain-producing fiber, and a mode expander is disposed between the input fiber and the gain fiber. In another embodiment, multiple pumps are coupled into the core of the gain fiber. The pumps may generate light of the same wavelength or of different wavelengths. In accordance with a particular embodiment of the invention, amplification of nanosecond optical pulses was demonstrated at 1545 nm in a single-clad Er-doped fiber having a core area of 875 µm$^2$, wherein the core was pumped by a high-brightness Raman laser at 1480 nm; and the pulses had a record peak power of several hundred kW. DiGiovanni et al. do not say anything about polarization.

There is a need for improved laser and amplifier systems, particularly large-mode-area (LMA) optical-fiber lasers and/or optical-fiber amplifiers, and optionally having delivery fibers, wherein the systems have improved beam quality (e.g., such that M$^2$ approaches 1, and/or such that output beam is polarized) and have very high average power.

SUMMARY OF THE INVENTION

In some embodiments, the present invention provides an apparatus, method and use for improving and merging two existing techniques (core pumping and cladding pumping) that are known to fiber-laser community to enable high-power fiber-laser systems having excellent beam quality while using large-core (LMA) step-index gain fibers at very high optical power. In some embodiments, the present invention operates in an optical gain fiber having a core and a plurality of cladding layers including a pump-cladding layer that guides cladding pump light within its outer circumference and gradually introduces the cladding-pump light into the core along its length, wherein signal light and core-pump light are directly coupled into an end of the core, and wherein cladding-pump light propagates in the pump-cladding layer on average over a substantial distance before gradually entering the core along its length. In some embodiments, both core pumping and cladding pumping are used wherein the core pumping includes mixing a laser seed optical signal (having a signal wavelength) with optical pump light (having a pump wavelength that is near the signal wavelength (e.g., in some embodiments, the pump wavelength is within the multiplet energy level of the signal wavelength for the rare-earth dopant species)) in a manner that matches the modes of the seed optical signal and the pump light. In some embodiments, because the pump wavelength and the signal wavelength are close to one another, the diameter of the core is made to a diameter that supports a single mode of both the pump wavelength and the signal wavelength. Because the mode of the pump light (e.g., the intensity of pump light as a function of radial distance from the fiber axis that runs down the center of the core) matches the mode of the seed optical signal (e.g., the intensity of the seed signal light as a function of radial distance from the fiber axis), the amplification of the seed signal due to the core pumping will preserve or even increase the quality of the signal beam in the core. However, because all of the core-pump light must travel through the rare-earth-doped core to get to the rare-earth dopants further down the fiber, it is substantially all absorbed within a short distance from the end into which it was launched, and thus solely core-pumped fiber lasers do not scale to very high powers. Another reason core-pumped fiber lasers do not scale well to very high power is that it is difficult to launch high amounts of pump light into the end of the core.

In contrast, cladding-pumped fiber lasers are much easier to scale to very high powers because the pump light travels down the undoped pump-light cladding (which is typically an inner cladding next to the core that is in turn surrounded by at least one outer cladding that keeps the pump light from exiting the outer boundary of the inner cladding) and then the pump light enters the core from the sides along the length of the fiber, the pump light can be launched so it reaches much further down the fiber before entering the core than would pump light traveling exclusively in the core from its end, and star couplers can be used to couple light from a large number of pump-light delivery fibers onto the pump-light cladding, which greatly increases the total amount of pump light that can be launched into a given gain fiber. Thus, the combination of core pumping and cladding pumping as combined in the present invention provides a high-beam-quality signal due to the initial core pumping and a very high-power and scalable amplification due to the cladding pumping.

In addition, in some embodiments, the present invention provides polarizers and/or polarization-maintaining fibers that make at least the signal beam polarized, which provides a higher-quality signal beam than other systems that do not use polarization-maintaining components for the optical-signal amplification.

In some embodiments, the present invention uses standard step-index fibers that are compatible with an all-fiber design, and addresses how to achieve good beam quality with high average power by using cladding pumping and mode-matched core pumping together.

In some embodiments, the present invention merges the resonant core-pumping technology with the cladding-pumping technology, whereby the resonant core pumping technology generates a strong pre-amplified seed source with excellent beam quality (this pre-amplified seed source is (i.e., becomes) the optical signal beam in the gain fiber after its initial amplification using energy from the core-pumped pump light), and the cladding pumping provides power scalability to very high powers (e.g., amplification to very high powers using arbitrarily long large-core fibers that have a pump-light-carrying cladding layer to convey pump light from a second source along the entire length of the fiber). In some embodiments, the power of this pre-amplified seed source is pre-amplified to the relatively high power level of about five to ten percent (5-10%) of the output power and the main power. Power scaling is achieved by adding cladding pumping along with long large-core gain sections, which enables the delivery of 1000 W or more of cw (continuous-wave) pump power in an all-glass structure (e.g., fused fiber-optic structure) without using free-space optics.

In some embodiments, this combination of technologies of the present invention is further improved by having a graded dopant distribution in the gain fiber, instead of a step-index dopant distribution. Some embodiments further include a mode-field adaptor that includes a short length of coreless fiber for beam expansion of the light from the core of a small-core-diameter input fiber, which is followed by a short length of graded-index (GRIN) fiber that reshapes the expanded beam for insertion to a following large-core large-mode-area (LMA) gain fiber. In some embodiments, a mode-matched delivery fiber is provided at the far end of the LMA gain fiber. In some embodiments, the small-core input fiber is fused to the coreless fiber, the coreless fiber is fused to the GRIN fiber, the GRIN fiber is fused to the LMA gain fiber, and the LMA gain fiber is fused to the delivery fiber.

In some embodiments, standard gain fibers, which are easy, reliable, and cost effective to manufacture, are used to build high-power all-fiber laser systems of the present invention. By using standard gain fibers and pump-signal combiners, some embodiments of the all-fiber laser system are assembled with standard fiber cleavers and standard fusion-splice equipment.

BRIEF DESCRIPTION OF THE DRAWINGS

FIG. 1A1 is a block diagram of a subsystem 101 that, in some embodiments, includes a large-mode-area (LMA) gain fiber 131 (in other embodiments, a step index gain fiber is used for gain fiber 131) having both mode-matched core pumping and co-propagating cladding pumping, according to some embodiments of the present invention.

FIG. 1A2 is a block diagram of a subsystem 102, that, in some embodiments, includes a large-mode-area (LMA) gain fiber 131 (in other embodiments, a step index gain fiber is used for gain fiber 131) having both mode-matched core pumping and co-propagating cladding pumping, according to some embodiments of the present invention.

FIG. 1A3 is a block diagram of a subsystem 103, that, in some embodiments, includes a large-mode-area (LMA) gain fiber 131 (in other embodiments, a step index gain fiber is used for gain fiber 131) having both mode-matched core pumping and co-propagating cladding pumping, according to some embodiments of the present invention.

FIG. 1B is a block diagram of large-mode-area (LMA) gain fiber 131 having both mode-matched core pumping and co-propagating cladding pumping.

FIG. 3A1 is a block diagram of a subsystem 301 that includes a large-mode-area (LMA) gain fiber 131 having mode-matched core pumping, co-propagating cladding pumping, and counter-propagating cladding pumping, according to some embodiments of the present invention.

FIG. 3A2 is a block diagram of a subsystem 302 that includes a large-mode-area LMA) gain fiber 131 having mode-matched core pumping, co-propagating cladding pumping, and counter-propagating cladding pumping, according to some embodiments of the present invention.

FIG. 4A is a schematic graph of rare-earth dopant concentration versus cross-sectional radial position of a large-mode-area (LMA) gain fiber 131, according to some embodiments of the present invention.

FIG. 4B is a schematic graph of index of refraction versus cross-sectional radial position of a large-mode-area (LMA) gain fiber 131, according to some embodiments of the present invention.

FIG. 4C is a schematic graph 403 of an alternative "Gaussian-profile" rare-earth dopant concentration versus cross-sectional radial position of a large-mode-area (LMA) gain fiber 131, according to some embodiments of the present invention.

DETAILED DESCRIPTION

Figure 2A:
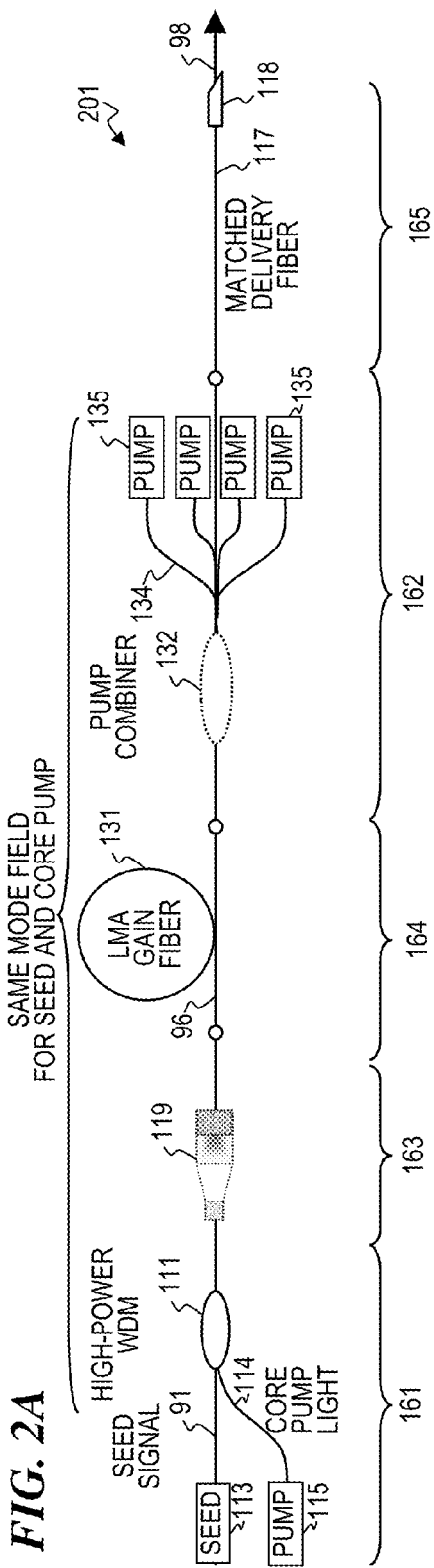
FIG. 2A is a block diagram of a subsystem 201 that includes a large-mode-area (LMA) gain fiber 131 having both mode-matched core pumping and counter-propagating cladding pumping, according to some embodiments of the present invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

Regarding core pumping, it has been shown (J. C. Jasapara et al., "Diffraction Limited Fundamental Mode Operation of Core-Pumped Very-Large-Mode-Area Er Fiber Amplifiers," *IEEE Journal of selected Topics in Quantum Electronics*, Vol. 15, No. 1, 2009, pp 3-11) that step-index gain fibers with high NA (NA=0.2) and a core diameter of 70 microns can be operated close to the fundamental mode (i.e., with high beam quality). In some embodiments of the present invention, improved performance is achieved by resonantly core pumping using a pump source that has a wavelength that is close to but slightly shorter than the signal wavelength (e.g., in some embodiments, both the core-pump wavelength and the signal wavelength are in the same energy-level multiplet of the rare-earth dopant in the signal-amplifying core). Under this condition, the pump beam and the seed signal beam have identical or nearly identical mode field diameters (i.e., they have the same or substantially the same mode field). In addition, the efficiency of pumping with a wavelength that pumps the same multiplet as the signal output is high because less energy is diverted to heat to obtain ions of the correct energy to amplify the signal than is the case when the pump light is initially absorbed into some other energy level. In some embodiments, the pump beam and the seed signal beam are combined by use of an all-fiber wavelength multiplexer and the combination is launched through a mode-field adaptor and into the gain fiber; the modes of the pump beam and the seed signal beam are matched to the fundamental mode of the large core gain fiber by use of the mode-field adaptor. Due to the presence of the pump-beam that is mode-matched to the signal beam, operation on the fundamental mode (amplification of the signal beam with a cross-sectional mode profile that matches the fundamental mode of the large-core gain fiber) of the step-index gain fiber can be achieved (gain guiding due to matched pump field). This mode-matched core-pumping technology has been demonstrated, however core pumping alone is not power scalable because:

(1) the pump power of the high-brightness pump source is limited to 20W-100 W—for some wavelengths, higher power levels are possible but such lasers would be expensive and complex; and (2) the cost-effective wavelength multiplexer that combines the seed signal and the pump source has a limited average-power rating of less than fifty watts (<50 W).

In summary, this core-pumping-only technique enables achieving good beam quality; however it does not enable power scaling.

Regarding cladding pumping: For a scalable high-power laser system (i.e., one that scales to power levels well in excess of 100 watts), the pump power is typically supplied into an inner cladding of a multiply-clad (double-clad, or three or more cladding layers) gain fiber (called cladding pumping) by means of a conventional pump-signal combiner (e.g., a "star" coupler) that enables the highest state-of-the-art pump-power delivery with minimal cost. This cladding-pumping technology is typically used in high-power laser systems and enables the delivery of pump-power levels in excess of one-thousand watts (1000 W). However, while conventional cladding-pumping-only techniques enable power scaling, they do not solve the problem of achieving good beam quality.

FIG. 1A1 is a block diagram of a subsystem 101 that, in some embodiments of the present invention, includes a large-mode-area (LMA) gain fiber 131 having both mode-matched core pumping and co-propagating cladding pumping. In other embodiments, a step index gain fiber is used for gain fiber 131. In some embodiments, subsystem 101 includes five sequential all-glass optical sections 161, 162, 163, 164, and 165. In some embodiments, section 161 provides a seed source 113 and core-pump source 115 that enable good beam quality and generation of strong seed beam 96 in fiber 116, section 162 provides cladding pump coupling so that light 86 includes the seed signal and the core pump light together (beam 96, which in some embodiments, is mode-matched and has pump light having a wavelength that is close to (e.g., in some embodiments, within ten percent (10%) of) the wavelength of the seed signal light) in the core of fiber 123 and includes the pump light from pump sources 125 and pump fibers 124 in the cladding of fiber 123 that together enable high average-pump-power amplification of the strong seed beam 96, section 163 provides mode-field adjustment for the optical seed beam and the core pump light to form large-core-beam light 87 as well as (in some embodiments) transmitting the cladding pump light from sources 125 into the cladding of fiber 118, section 164 provides high average-power generation with excellent beam quality, and section 165 provides signal delivery of output beam 98. In some embodiments, a section 1620 (See FIG. 3A1) provides reverse-propagating pump light.

In some embodiments, an optical-seed source 113 (such as a semiconductor diode laser, an optically pumped small-mode-area gain fiber laser, a controlled linewidth ASE source, as described more fully in U.S. Pat. No. 7,539,231 titled "Apparatus and method for generating controlled-linewidth laser-seed-signals for high-powered fiber-laser amplifier systems" that issued May 26, 2009 to Eric C. Honea et al., or a sliced-chirp laser as described more fully in U.S. Pat. No. 7,701,987 titled "Apparatus and method for generating chirp-slice controlled-linewidth laser-seed signals" issued Apr. 20, 2010 to Matthias P. Savage-Leuchs et al., each of which is incorporated herein in their entirety by reference) or other suitable source emits a seed signal 91 (which, in some embodiments, is a continuous-wave (CW) signal, and in other embodiments, is a pulsed signal) in the core of an optical fiber 1130 that. An optical pump-light source 115 (e.g., in some embodiments, a semiconductor-diode laser) emits core-pump light 114 in an optical fiber 1140. In some embodiments, the seed signal 91 and core-pump light 114 are combined into beam 96 by a high-power wavelength-division multiplexor (WDM) 111 and beam 96 is output in the core of fiber 116.

In some embodiments, fiber 116 is fused to a core input of a pump-and-signal combiner 122, and a plurality of optical pump fibers 124, each carrying pump light from a respective one of a plurality of pump lasers 125, are connected to cladding inputs of pump-and-signal combiner 122 (wherein the cladding inputs guide pump light into the inner cladding of fiber 123 from the cores of fibers 124). In some embodiments, a mode-field adaptor (MFA) 119 (which, in some embodiments, uses the configuration of MFA 501 of FIG. 5A described below) expands the diameter and matches the mode field of the combined signal-and-core-pump-light beam in the core to a fundamental mode of a large-mode area fiber 118, while also conveying the cladding light of fiber 123 to the cladding of fiber 118. That is, the combination of core and cladding light 86 (with a small-size core and thicker cladding)

is transformed to the combination of core and cladding light 87 (with a larger-size core and thinner cladding) by MFA 119. In some embodiments, fiber 118 extends from MFA 119 to large-mode-area (LMA) gain fiber 131. Thus the left end of LMA gain fiber 131 has mode-field-matched signal light (from seed source 113) and core-pump light (from pump source 115) inserted to its core at the left-hand end by fiber 118 from MFA 119, and has cladding-pump light (from the plurality of pump sources 125) inserted from fiber 118 into its cladding at the left-hand end in a co-propagating direction (i.e., the cladding pump light propagates in the same direction as the signal light (as does the core pump light). In some embodiments, the output end of LMA gain fiber 131 is connected to a mode-matched delivery fiber 117 that has an endcap 1181, and output beam 98 emerges from endcap 1181. The seed source 113 and core-pump source 115 and their WDM combiner 111 and cladding-pump combiner 122 work together to provide the good signal beam quality and the mode-matched pump light to generate a strong seed beam in the initial portion of LMA gain fiber 131, and the cladding pump sources 125 and cladding-pump coupling of fibers 124 and MFA 119 provide pump light into the pump cladding to enable high-average-pump-power amplification (allowing high-power scaling) of the strong seed beam to achieve high-average-power generation and excellent beam quality.

FIG. 1A2 is a block diagram of a subsystem 102 that includes a large-mode-area (LMA) gain fiber 131 having both mode-matched core pumping and co-propagating cladding pumping, according to some embodiments of the present invention. In other embodiments, a step index gain fiber is used for gain fiber 131. In some embodiments, subsystem 102 includes the five sections 161, 162, 163, 164, and 165 of subsystem 101 of FIG. 1A1, but instead of being arranged in the original sequential order, sections 163 and 162 swap places such that subsystem 102 is rearranged, with the order of sections now being 161, 163, 162, 164, and 165. In addition, MFA 1190 increases the mode-field diameter of the core, but need not convey cladding pump light from fiber 116 to fiber 1180. Thus, the signal 96 in fiber 116 from WDM 111 is the same as in FIG. 1A1, but the light 88 in fiber 1180 has the expanded mode-field-matched core signal and core pump light in the LMA core of fiber 1180, and the cladding pump light has not yet been launched into the cladding. Thereupon, the high-power cladding light from pump sources 125 is launched into the cladding of fiber 1180 by cladding-pump combiner 1220 to produce the combination of core and cladding light 87 (with a larger-size core than fiber 116).

In some embodiments, a seed source 113 (such as a semiconductor diode laser, an optically pumped small-mode-area gain fiber laser, a controlled linewidth ASE source, as described more fully in U.S. Pat. No. 7,539,231 titled "Apparatus and method for generating controlled-linewidth laser-seed-signals for high-powered fiber-laser amplifier systems" that issued May 26, 2009 to Eric C. Honea et al., or a sliced-chirp laser as described more fully in U.S. Pat. No. 7,701,987 titled "Apparatus and method for generating chirp-slice controlled-linewidth laser-seed signals" issued Apr. 20, 2010 to Matthias P. Savage-Leuchs et al., each of which is incorporated herein in their entirety by reference) emits a seed signal 91 (which, in some embodiments, is a continuous-wave (CW) signal, and in other embodiments, is a pulsed signal) in an optical fiber. An optical pump-light source 115 (e.g., in some embodiments, a semiconductor-diode laser) emits core-pump light 114 in an optical fiber 1140. In some embodiments, the seed signal 91 in fiber 1130 and core-pump light 114 in fiber 1140 are combined by a high-power wavelength-division multiplexor (WDM) 111 and output in the core of fiber 116.

Further referring to FIG. 1A2, in some embodiments, a mode-field adaptor (MFA) 1190 (which, in some embodiments, uses the configuration of MFA 501 of FIG. 5A or MFA 502 of FIG. 5B described below) expands the diameter and matches the mode field of the combined signal-and-core-pump-light beam 96 to a fundamental mode (core signal 88) of a large-mode area fiber 1180. In some embodiments, fiber 1180 is fused to a core input of a pump-and-signal combiner 1220, and a plurality of optical pump fibers 124, each carrying pump light from a respective one of a plurality of pump lasers 125, are connected to cladding inputs of pump-and-signal combiner 1220 (wherein the cladding inputs guide pump light into the inner cladding of LMA fiber 1230 from the cores of fibers 124). In some embodiments, fiber 1230 extends from combiner 1220 to large-mode-area (LMA) gain fiber 131. Thus the left end of LMA gain fiber 131 has mode-field-matched signal light (from seed source 113) and core-pump light (from pump source 115) inserted to its core at the left-hand end by fiber 1230 from pump-and-signal combiner 1220, and has cladding-pump light (from the plurality of pump sources 125) inserted from fiber 1230 into its cladding at the left-hand end in a co-propagating direction (i.e., the cladding pump light propagates in the same direction as the signal light (as does the core pump light). In some embodiments, the output end of LMA gain fiber 131 is connected to a mode-matched delivery fiber 117 that has an endcap 1181, and output beam 98 emerges from endcap 1181. The seed source 113 and core-pump source 115 and their WDM combiner 111 and MFA 119 work together to provide the good signal beam quality and the mode-matched pump light to generate a strong seed beam in the initial portion of LMA gain fiber 131, and the cladding pump sources 125 and cladding-pump coupling of fibers 124 and combiner 1220 provide pump light into the pump cladding to enable high-average-pump-power amplification (allowing high-power scaling) of the strong seed beam to achieve high-average-power generation and excellent beam quality.

In some embodiments, this performance is achieved by resonantly core pumping using a pump source that has a wavelength that is close to but slightly shorter than the signal wavelength (e.g., in some embodiments, both wavelengths are in the same energy-level multiplet of the rare-earth dopant in the signal-amplifying core). Under this condition, the pump beam and the seed signal beam have the same mode field. In some embodiments, the pump beam and the seed signal beam are combined by use of an all-fiber wavelength multiplexer and the combination is launched through a mode-field adaptor and into the gain fiber; the modes of the pump beam and the seed signal beam are matched to the fundamental mode of the large core gain fiber by use of the mode-field adaptor. Due to the presence of the pump-beam that is mode-matched to the signal beam, operation on the fundamental mode (amplification of the signal beam with a cross-sectional mode profile that matches the fundamental mode of the large-core gain fiber) of the step-index gain fiber can be achieved (gain guiding due to matched pump field). This mode-matched core-pumping technology has been demonstrated.

FIG. 1A3 is a block diagram of a subsystem 103 that includes a large-mode-area (LMA) gain fiber 131 having both mode-matched core pumping and co-propagating cladding pumping, according to some embodiments of the present invention. In other embodiments, a step index gain fiber is used for gain fiber 131. In some embodiments, subsystem 103 includes the five sections 161, 162, 163, 164, and 165 of subsystem 102 of FIG. 1A2, but in place of mode field adaptor 1190 of subsystem 102, section 163 of subsystem 103 uses a tapered fiber coupler 1191. In some embodiments, tapered fiber coupler 1191 is formed by heating and stretching (a center portion of a double-clad fiber initially having a core size and inner-cladding size that match the large core and large inner cladding of the signal-input fiber of pump/signal combiner 1220) until the stretched portion has core and inner cladding diameters that match the core and inner cladding diameters of 116. In some embodiments, the mode-field adaptor described in any of the other embodiments described herein having a mode-field adaptor is replaced by a tapered fiber segment 1191.

FIG. 1B is a block diagram of large-mode-area (LMA) gain fiber 131 having both mode-matched core pumping and co-propagating cladding pumping. The core pump light, mode matched with the seed light, generates strong diffraction-limited seed beam (which is gain guided since the pump light intensity matches the seed light intensity, and provides high pump-light absorption. The core-pump wavelength, being close to the seed signal wavelength, is important for fine tuning the "effective seed length." The combined signal-and-core-pump-light beam 96 is inserted to the core 136 of LMA gain fiber 131, while the cladding pump light is inserted into the inner cladding 137. In some embodiments, the inner cladding 137 is surrounded by one or more outer claddings 138, which serve to guide the cladding-pump light 124 such that it stays in the inner cladding 137, and such that the cladding-pump light 124 enters the core 136 along substantially its entire length $\mathscr{L}$ 139. On the other hand, the core pump light is substantially all absorbed within an initial length $\ell$ 133 (e.g., after this initial length, the pump light has been depleted to such an extent that no further signal amplification in gain fiber 131 is done using core pump light), where, due to the core-pump-light's mode shape, the core pump light serves to enhance the quality of the seed signal. In some embodiments, (see FIG. 4A, FIG. 4B, and their description below), the dopant profile relative to the optical-fibers core index-of-refraction profile serves to further maintain and/or enhance the mode-profile quality of the signal beam. In some embodiments, a change in core-pump-light wavelength will change the effective seed-pre-amplification length 133, and thus in some embodiments, the wavelength of the core pump light is set to a predetermined pump-light wavelength and/or adjusted to an adjusted pump-light wavelength based on a measurement of the quality of the output beam 98 during operation of the laser subsystem 101 (or subsystem 201 of FIG. 2A, or subsystem 301 of FIG. 3A), in order to improve or optimize the quality of the output beam 98.

FIG. 2A is a block diagram of a subsystem 201 that includes a large-mode-area (LMA) gain fiber 131 having both mode-matched core pumping and counter-propagating cladding pumping, according to some embodiments of the present invention. In some embodiments, subsystem 201 includes a plurality of pump sources 135 each coupled to pump combiner 132 by a respective optical fiber 134. Pump combiner 132 serves to launch pump light into the cladding of fiber 131 in a counter-propagating direction (i.e., the cladding pump light propagates in the opposite direction as the signal light and the core pump light). In some embodiments, this provides fewer non-linearities and better efficiency, however, the pump sources 135 need to be protected from signal light that may leak into the cladding and then through fibers 134 into the pump sources 135 (in some embodiments, each of the pump sources 135 includes a semiconductor diode laser and an isolator and/or dichroic beam splitter that prevent signal light from entering the semiconductor diode laser from LMA gain fiber 131). Other than the direction of the cladding pump light and the need to protect pump-laser sources 135 from signal light (left-to-right-traveling light in this figure), the various aspects of subsystem 201 are the same as corresponding aspects of subsystem 101 of FIG. 1A1.

Figure 2B:
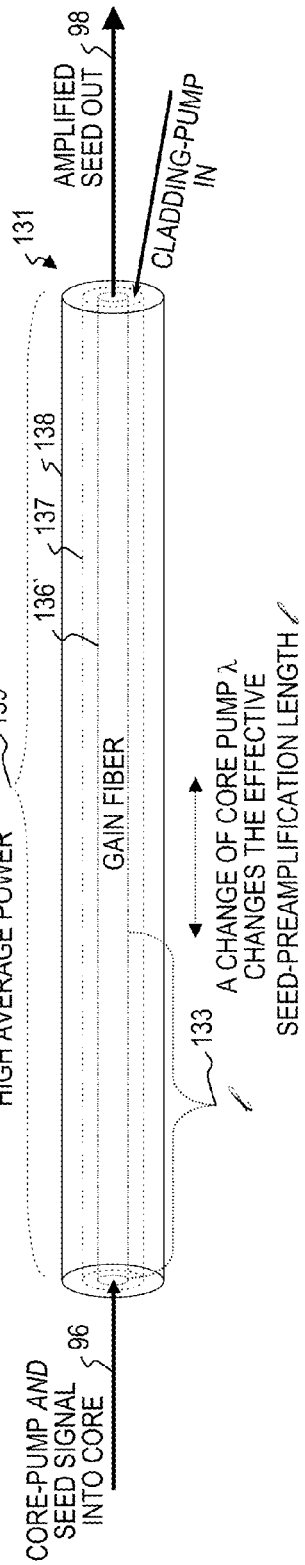
FIG. 2B is a block diagram of large-mode-area (LMA) gain fiber 131 having both mode-matched core pumping and counter-propagating cladding pumping.

FIG. 2B is a block diagram of large-mode-area (LMA) gain fiber 131 having both mode-matched core pumping and counter-propagating cladding pumping. Other than the direction of the cladding pump light, the various aspects of gain fiber 131 are the same as corresponding aspects of gain fiber 131 of FIG. 1B.

FIG. 3A1 is a block diagram of a subsystem 301 that includes a large-mode-area (LMA) gain fiber 131 having mode-matched core pumping, co-propagating cladding pumping, and counter-propagating cladding pumping, according to some embodiments of the present invention. In some embodiments, subsystem 301 includes both a plurality of pump sources 125 each coupled to pump/signal combiner 122 by a respective optical fiber 124, as described above for FIG. 1A1, as well as a plurality of pump sources 135 each coupled to pump combiner 132 by a respective optical fiber 134 to provide counterpropagating cladding pump light.

Pump/signal combiner 122 and pump combiner 132 serve the purposes described above in FIG. 1A1 and FIG. 2A, respectively. Other than some of the cladding pump light traveling in a co-propagating direction from pump/signal combiner 122, and some of the cladding pump light traveling in a counter-propagating direction from pump combiner 132 and the possible need to protect pump-laser sources 135 from signal light (left-to-right-traveling light in this figure), the various aspects of subsystem 301 are the same as corresponding aspects of subsystem 101 of FIG. 1A1.

FIG. 3A2 is a block diagram of a subsystem 302 that includes a large-mode-area (LMA) gain fiber 131 having mode-matched core pumping, co-propagating cladding pumping, and counter-propagating cladding pumping, according to some embodiments of the present invention. In some embodiments, subsystem 301 includes both a plurality of pump sources 125 each coupled to pump/signal combiner 1220 by a respective optical fiber 124 and a plurality of pump sources 135 each coupled to pump combiner 132 by a respective optical fiber 134.

Pump/signal combiner 1220 and pump combiner 132 serve the purposes described above in FIG. 1A2 and FIG. 2A, respectively. Other than some of the cladding pump light traveling in a co-propagating direction from pump/signal combiner 1220, and some of the cladding pump light traveling in a counter-propagating direction from pump combiner 132 and the possible need to protect pump-laser sources 135 from signal light (left-to-right-traveling light in this figure) and/or the possible need to protect pump-laser source 115 and seed-light source 113 from pump light (right-to-left-traveling light in this figure), the various aspects of subsystem 302 are the same as corresponding aspects of subsystem 102 of FIG. 1A2 and subsystem 201 of FIG. 2A.

Figure 3B:
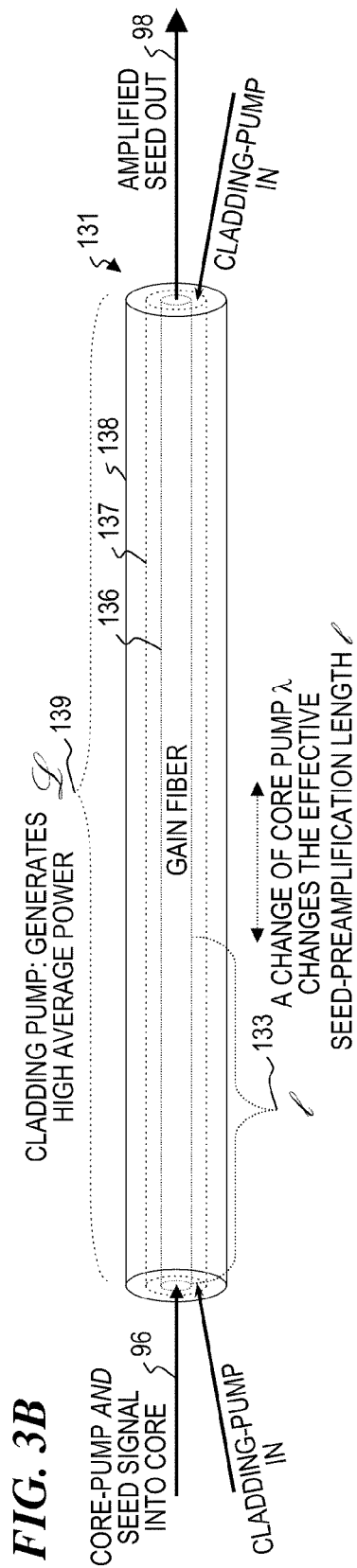
FIG. 3B is a block diagram of large-mode-area (LMA) gain fiber 131 having mode-matched core pumping, co-propagating cladding pumping and counter-propagating cladding pumping.

FIG. 3B is a block diagram of large-mode-area (LMA) gain fiber 131 having mode-matched core pumping, co-propagating cladding pumping and counter-propagating cladding pumping. Other than some of the cladding pump light traveling in a co-propagating direction from the left, and some of the cladding pump light traveling in a counter-propagating direction from the right and the possible need to protect pump-laser sources 135 from signal light (left-to-right-traveling light in this figure), the various aspects of gain fiber 131 of FIG. 3B are the same as corresponding aspects of gain fiber 131 of FIG. 1B and gain fiber 131 of FIG. 2B.

FIG. 4A is a schematic graph 401 of a "rounded" rare-earth dopant concentration versus cross-sectional radial position of a large-mode-area (LMA) gain fiber 131 (such as the gain fibers 131 described above for other figures), according to some embodiments of the present invention. As shown in FIG. 4A and FIG. 4B, the doped center portion of rare-earth-doping profile 401 of FIG. 4A (the concentration of dopant versus radial position) has a smaller diameter than the diameter of the core as defined by the index of refraction of FIG. 4B (or, in the case of photonic crystal fibers, the core diameter as defined by the longitudinal holes that define the radial extent of the core signal). In addition, in some embodiments, the dopant concentration increases from zero or nearly zero at the outer diameter of the core and has a rounded plateau in the middle of the core, somewhat matching a Gaussian-profile signal-beam intensity in the core, and thus the mode-field diameter (MFD) is determined in large part by the doping profile. In some other embodiments (shown in FIG. 4C), the dopant concentration substantially matches a Gaussian-profile signal-beam intensity in the core. Because of the variation in dopant concentration in the core, the fundamental mode of the signal beam is amplified more than other possible modes of the large-diameter core. The center axis of the LMA fiber 131 is represented by the vertical dot-dash line in the center of FIG. 4A, FIG. 4B and FIG. 4C.

FIG. 4B is a schematic graph 402 of index of refraction versus cross-sectional radial position of a large-mode-area (LMA) gain fiber 131, according to some embodiments of the present invention. In some embodiments, the highest index of refraction in graph 402 corresponds to the diameter-cross-section of core 136 of fiber 131 of FIG. 1B, FIG. 2B, and FIG. 3B, the next-highest-index-of-refraction shoulders on either side of the core in graph 402 correspond to the diameter-cross-section of inner cladding 137 of fiber 131 of FIG. 1B, FIG. 2B, and FIG. 3B, and the third-highest-index-of-refraction shoulders on either side of the inner cladding in graph 402 correspond to the diameter-cross-section of outer cladding 138 of fiber 131 of FIG. 1B, FIG. 2B, and FIG. 3B. Thus the index-of-refraction-defined core and the smaller-diameter dopant profile work together to support fundamental-mode operation and amplification in the large-MFD fiber, and the rounded-cross-sectional dopant profile (e.g., as shown in FIG. 4A supports good mode quality.

FIG. 4C is a schematic graph 403 of a "Gaussian-profile" rare-earth dopant concentration versus cross-sectional radial position of a large-mode-area (LMA) gain fiber 131, according to some embodiments of the present invention. In this alternative to the dopant profile embodiment shown in FIG. 4A, the dopant concentration relative to radial position in the fiber more closely matches the Gaussian profile of the desired fundamental mode of the signal light in the core of the gain fiber 131.

Figure 4D:
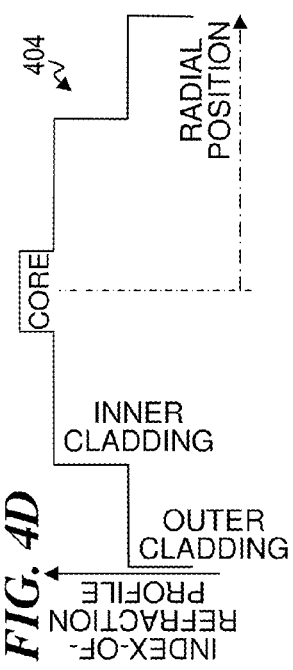
FIG. 4D is a schematic graph 404 of index of refraction versus cross-sectional radial position of a small-mode-area (SMA) fiber 512, according to some embodiments of the present invention.

FIG. 4D is a schematic graph 404 of index of refraction versus cross-sectional radial position of a small-mode-area (SMA) fiber 512 of FIG. 5A described below (such as a small-mode-area (SMA) gain fiber in a seed source 113 or SMA delivery fiber 116 (each shown in FIG. 1A1 described above)), according to some embodiments of the present invention. In some embodiments, the signal light and the core-pump light are both inserted into the core of the SMA fiber.

Figure 4E:
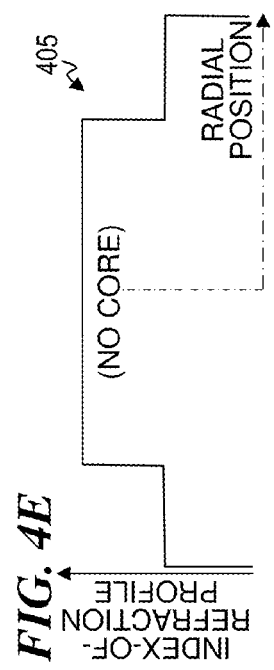
FIG. 4E is a schematic graph 405 of index of refraction versus cross-sectional radial position of a coreless fiber 514, according to some embodiments of the present invention.

FIG. 4E is a schematic graph 405 of index of refraction versus cross-sectional radial position of a coreless fiber 514 (shown in FIG. 5A described below), according to some embodiments of the present invention. In some embodiments, the signal light and the pump light are both expanded by the short section of coreless fiber.

Figure 4F:
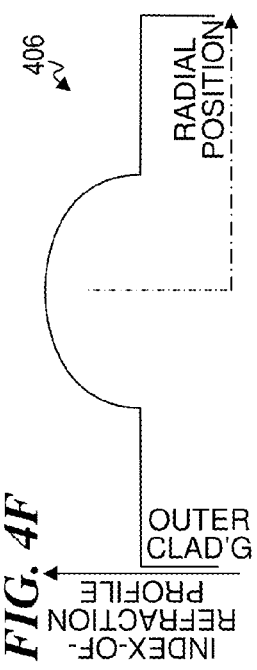
FIG. 4F is a schematic graph 406 of index of refraction versus cross-sectional radial position of a GRIN fiber 516, according to some embodiments of the present invention.

FIG. 4F is a schematic graph 406 of index of refraction versus cross-sectional radial position of a GRIN fiber 516 (shown in FIG. 5A described below), according to some embodiments of the present invention. In some embodiments, the signal light and the pump light are both focussed by the short section of GRIN fiber. The length of the coreless fiber and length of the GRIN fiber are chosen such that the combined signal light and core-pump light are expanded and focussed the proper amount to match the mode field of the LMA fiber 518.

Figure 4G:
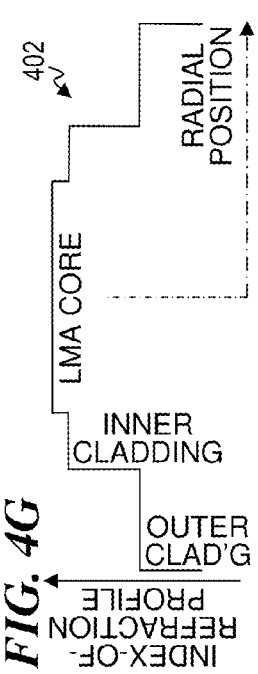
FIG. 4G is another schematic graph 402 of index of refraction versus cross-sectional radial position of a large-mode-area (LMA) gain fiber 518, according to some embodiments of the present invention.

FIG. 4G is another schematic graph 402 of index of refraction versus cross-sectional radial position of a large-mode-area (LMA) gain fiber 518 (shown in FIG. 5A described below), according to some embodiments of the present invention.

Figure 5A:
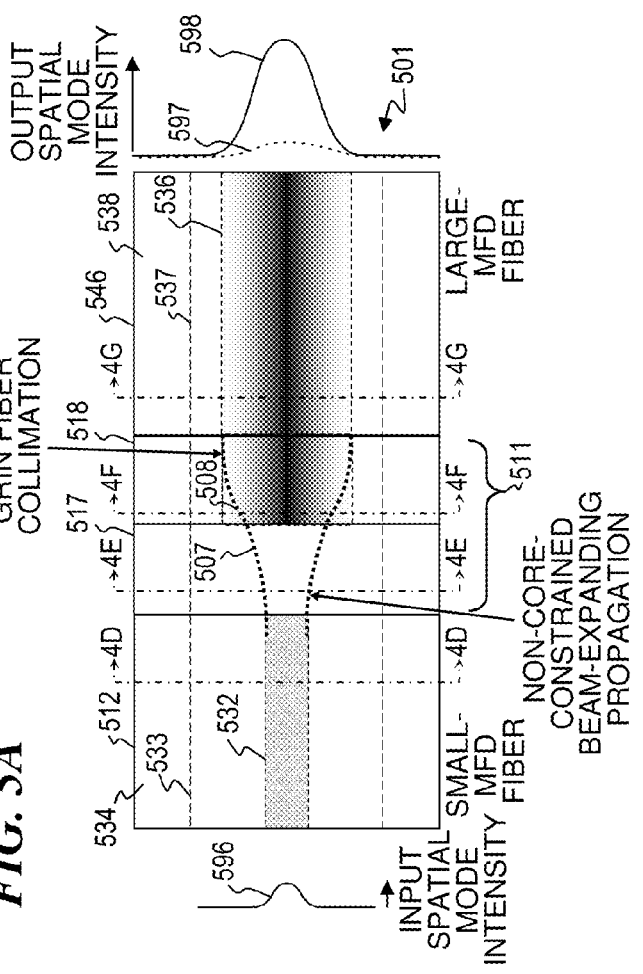
FIG. 5A is a longitudinal-cross-section schematic diagram of an optical-amplifier subsystem 501 that includes a cladding-pump-retaining mode-field adaptor 511 that is usable for mode-matching signal light and core pump light at a transition between a small-mode-field-diameter optical fiber 512 and a large-mode-field-diameter optical fiber 518, according to some embodiments of the present invention.
Figure 5B:
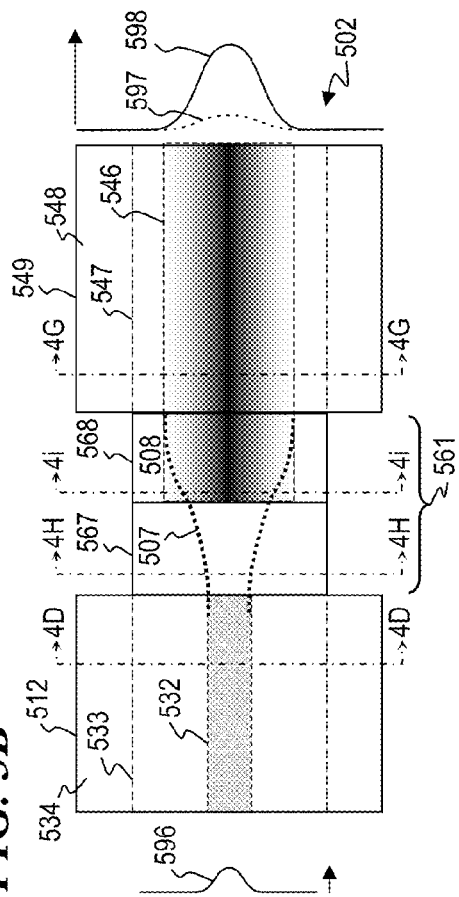
FIG. 5B is a longitudinal-cross-section schematic diagram of an optical-amplifier subsystem 502 that includes a mode-field adaptor 561, according to some embodiments of the present invention.
Figure 4H:
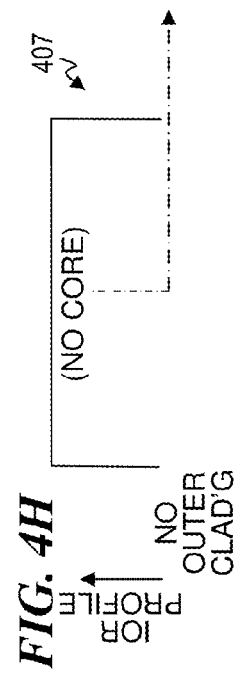
FIG. 4H is a schematic graph 407 of the index-of-refraction lateral cross-section of a section of coreless and claddingless fiber 567, according to some embodiments of the present invention.

FIG. 4H is a schematic graph 407 of the index-of-refraction lateral cross-section of a section of coreless and claddingless fiber 567 (such as shown in FIG. 5B), according to some embodiments of the present invention. In some embodiments, the outer diameter of this coreless section is substantially equal to the diameter of the inner cladding of SMA fiber 512 and or the inner cladding of LMA fiber 548 in FIG. 5B. In some such embodiments, once the short section of coreless fiber is fused in place, the device 502 is coated with a lower index-of-refraction material that acts as an outer cladding in order that the device becomes a cladding-pump-light-retaining structure. See FIG. 5B for further details.

Figure 4I:
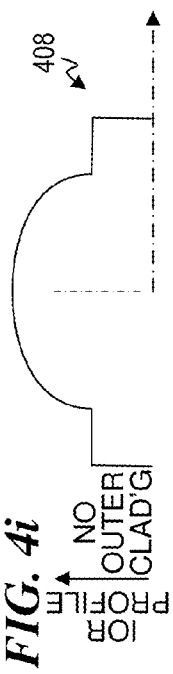
FIG. 4i is a schematic graph 408 of the index-of-refraction lateral cross-section of a section of a claddingless GRIN fiber 568, according to some embodiments of the present invention.

FIG. 4i is a schematic graph 408 of the index-of-refraction lateral cross-section of a section of GRIN fiber 568 (such as shown in FIG. 5B), according to some embodiments of the present invention. In some embodiments, the outer diameter of this GRIN section is substantially equal to the diameter of the inner cladding of SMA fiber 512 and or the inner cladding of LMA fiber 548 in the other figures. The GRIN fiber has a rounded index that provides a focussing function for the expanded combined seed signal and core pump light. In some such embodiments, once the short section of GRIN fiber is fused in place, the device is coated with a lower index-of-refraction material that acts as an outer cladding in order that the device becomes a cladding-pump-light-retaining structure. See FIG. 5B for further details.

FIG. 5A is a block diagram of a mode-field adaptor (MFA) 501 that is usable for mode-matching signal light and core pump light at a transition between a double-clad small-mode-field-diameter (small-MFD) optical fiber 512 (which includes a core 532, inner cladding 533 and outer cladding 534) and a large-mode-field-diameter (large-MFD) optical fiber 518 (which includes a core 536, inner cladding 537 and outer cladding 538), according to some embodiments of the present invention. This diagram conceptually shows the detail for mode matching between light in a small-core fiber to the mode of a LMA fiber for situations where it is important for the interface technology to match the desired mode field of the large-core fiber. The dash-dot lines labeled 4D, 4E, 4F and 4G are the cross-sectional positions that correspond to the index-of-refraction profiles shown in FIG. 4D, FIG. 4E, FIG. 4F and FIG. 4G, respectively. In some embodiments, MFA 501 includes a short section of fiber 514 (sometimes called a coreless fiber 514) that has no defined core region, i.e., there is no raised index of refraction that confines light in the centermost core region and thus the light (which, in some embodiments, includes both signal light and core-pump light) from the core 532 of the small-MFD fiber 512 will expand and diverge until it reaches the short section of graded-index (GRIN) fiber 516, which will focus and/or collimate the expanded light beam from core 532 such that the beam enters the core 536 having a cross-sectional-intensity mode that closely matches the fundamental mode of the large-MFD fiber 518. The length of the coreless fiber 514 and length of the GRIN fiber 518 are chosen based on the mode-field diameter of SMA fiber 512 and on the mode-field diameter of LMA fiber 518 such that the combined signal light and core-pump light from SMA fiber 512 are expanded and focussed the proper amount to match the mode field area of the LMA fiber 518. In some embodiments, the small-MFD fiber 512 includes an inner cladding 533 that has a higher index of refraction than the index of refraction of its outer cladding 534 and that carries pump light, and this pump-light-carrying inner cladding has a size (e.g., the diameter of the index-of-refraction change that defines the inner cladding's outer diameter) that matches a corresponding index-of-refraction-change size of coreless fiber 514, a corresponding index-of-refraction-change size of GRIN fiber 516, and corresponding index-of-refraction-change size that defines the inner cladding of LMA fiber 518. In some embodiments, this allows the cladding pump light to travel across the MFA 501 either in a left-to-right direction, a right-to-left direction, or both directions. In other embodiments, the inner cladding diameters need not be matched as just described. In some embodiments, the outer-cladding diameters of SMA fiber 512, coreless fiber 514, GRIN fiber 516, and LMA fiber 518.

FIG. 5B is a longitudinal-cross-section schematic diagram of an optical-amplifier subsystem 502 that includes a mode-field adaptor 561, according to some embodiments of the present invention. This configuration is much the same as that of FIG. 5A, and the same reference numbers in each figure refer to the same structure. In FIG. 5B, the mode-field adaptor 561 does not include an outer cladding when assembled to this point, however, in some embodiments, the device is coated with a lower-index-of-refraction material in order to protect it and/or to form an outer cladding that provides a cladding-pump-light guiding function. The cross-section-indication arrows labeled 4D, 4H, 4i and 4G in this figure are the locations to which the index-of-refraction graphs of FIG. 4D, FIG. 4H, FIG. 4i, and FIG. 4G refer. In some embodiments, the LMA fiber 548 (having core 546, inner cladding 547 and outer cladding 548 has an undoped core and is later fused at its output end to a doped-core LMA gain fiber.

In some embodiments, other mode-field adapters usable in the present invention are found in P.C.T. Patent Application PCT/US2011/031863, titled "SIGNAL AND PUMP MODE-FIELD ADAPTOR FOR DOUBLE-CLAD FIBERS AND ASSOCIATED METHOD," filed on Apr. 9, 2011 by inventors Matthias P. Savage-Leuchs and Christian E. Dilley, which is incorporated herein by reference.

In some embodiments, the present invention provides a method that includes providing a gain fiber, wherein the gain fiber includes a core waveguide, a inner cladding waveguide that surrounds the core waveguide, and an outer cladding that surrounds the inner cladding waveguide; inserting an optical seed signal having a signal wavelength and pump light having a first pump wavelength into the core waveguide of the gain fiber; inserting pump light having a second pump wavelength into the inner cladding waveguide of the gain fiber; amplifying the seed signal in a first portion of the gain fiber using at least energy from the pump light having the first wavelength; and further amplifying the seed signal in a second portion of the gain fiber using energy from the pump light having the second wavelength.

In some embodiments, the method further includes providing an optical structure optically coupled to the gain fiber, wherein the optical structure includes a core waveguide, a inner cladding waveguide that surrounds the core waveguide, and an outer cladding that surrounds the inner cladding waveguide; receiving an optical seed signal having a signal wavelength; receiving optical pump light having a first pump wavelength; combining the received seed signal and the received pump light having the first pump wavelength into the core waveguide of the optical structure; in the optical structure, expanding the combined seed signal and pump light having the first pump wavelength and mode matching the expanded seed signal and pump light to a fundamental mode of the gain fiber; receiving optical pump light having a second pump wavelength; and inserting the pump light having the second pump wavelength into the inner cladding waveguide of the optical structure, wherein the inserting of the seed signal and the pump light having the first pump wavelength into the core waveguide of the gain fiber includes coupling the expanded and mode-matched seed signal and pump light having the first pump wavelength into the core of the gain fiber from the core of the optical structure, and wherein the inserting of the pump light having the second pump wavelength into the inner cladding waveguide of the gain fiber includes coupling the pump light having the second pump wavelength into the inner cladding of the gain fiber from the inner cladding of the optical structure. In some such embodiments, the providing of the optical structure includes providing a wavelength-division multiplexor (WDM) that includes a signal-input fiber for the receiving of the seed signal, a pump-input fiber for the receiving of the optical pump light having the first pump wavelength and a WDM output fiber, and wherein the WDM is used for the combining of the seed signal and the pump light having the first pump wavelength; providing a mode-field adaptor (MFA) that is used for the expanding of the combined seed signal and pump light having the first pump wavelength and provides the mode matching of the expanded seed signal and pump light to a fundamental mode of the gain fiber; and providing a cladding-pump combiner (CPC) that includes a core-input fiber, a CPC output fiber and a plurality of pump-input fibers for the receiving of the pump light having the second pump wavelength, wherein the cladding-pump combiner provides the inserting of the pump light having the second pump wavelength into the inner cladding waveguide of the optical structure, and wherein the WDM output fiber is fused to the MFA, the MFA is fused to the core-input fiber of the CPC, and the CPC output fiber is fused to the gain fiber.

In some embodiments, the present invention provides a method that includes providing an optical structure that includes a gain fiber, wherein the optical structure includes a core waveguide, a inner cladding waveguide that surrounds the core waveguide, and an outer cladding that surrounds the inner cladding waveguide; receiving an optical seed signal having a signal wavelength; receiving optical pump light having a first pump wavelength; combining the received seed signal and the received pump light having the first pump wavelength into the core waveguide of the optical structure; receiving optical pump light having a second pump wavelength; inserting the pump light having the second pump wavelength into the inner cladding waveguide of the optical structure; amplifying the seed signal in a first portion of the gain fiber using at least energy from the pump light having the first wavelength; and further amplifying the seed signal in a second portion of the gain fiber using energy from the pump light having the second wavelength. In some embodiments, the method further includes expanding the combined seed signal and pump light having the first pump wavelength and mode matching the expanded seed signal and pump light to a fundamental mode of the gain fiber. In some embodiments, the providing of the optical structure further includes providing a wavelength-division multiplexor (WDM) that includes a signal-input fiber for the receiving of the seed signal, a pump-input fiber for the receiving of the optical pump light having the first pump wavelength and a WDM output fiber, and wherein the WDM combines seed signal and pump light having the first pump wavelength; providing a mode-field adaptor (MFA) that provides the expanding of the combined seed signal and pump light having the first pump wavelength and provides the mode matching of the expanded seed signal and pump light to a fundamental mode of the gain fiber; and providing a cladding-pump combiner (CPC) that includes a core-input fiber, a CPC output fiber and a plurality of pump-input fibers for the receiving of the pump light having the second pump wavelength, wherein the cladding-pump combiner provides the inserting of the pump light having the second pump wavelength into the inner cladding waveguide of the optical structure, and wherein the WDM output fiber is fused to the MFA, the MFA is fused to the core-input fiber of the CPC, and the CPC output fiber is fused to the gain fiber.

In some embodiments, at least a portion of the expanding of the combined seed signal and pump light having the first pump wavelength is done in a section of coreless fiber, and wherein at least a portion the mode matching of the expanded seed signal and pump light to the fundamental mode of the gain fiber is done using a section of graded-index (GRIN) fiber fused to the section of coreless fiber.

In some embodiments of the method, the length of the section of coreless fiber and the length of the section of GRIN fiber are selected based on a core diameter and/or other geometry of a laser input fiber and on a core diameter and/or other geometry of an amplifier output fiber in order to mode match the combined seed signal and pump light having the first pump wavelength to a fundamental mode of the amplifier output fiber. In some embodiments, the amplifier output fiber is coupled through a cladding-pump-light combiner into the gain fiber.

Some embodiments of the method further include providing a vehicle (such as a submarine, surface ship, aircraft, tank, Humvee®-type or other type of vehicle or the like) having an enclosure; supplying electrical power; using the electrical power, controlling and providing power for generating the pump light having the first wavelength and for generating the pump light having the second wavelength; and controlling an output direction of the output beam in one of a plurality of different possible directions relative to the vehicle.

Some embodiments of the method further include providing a manufacturing machine (such as a laser welder, laser-ablation cutter, materials processor or the like) having an enclosure; supplying electrical power; using the electrical power, controlling and providing power for generating the pump light having the first wavelength and for generating the pump light having the second wavelength; and controlling an output direction of the output beam in one of a plurality of different possible directions relative to the manufacturing machine.

Some embodiments of the method further include providing a medical instrument (such as a laser nerve stimulator, a laser surgical cutting and/or cauterizing tool, or the like) having an enclosure; supplying electrical power; using the electrical power, controlling and providing power for generating the pump light having the first wavelength and for generating the pump light having the second wavelength; and controlling an output direction of the output beam in one of a plurality of different possible directions relative to the medical instrument.

In some embodiments of the method, the signal wavelength is longer that the first wavelength and is not more than ten percent (10%) of the first wavelength longer than the first wavelength (e.g., in various embodiments, the first wavelength is about 1480 nm, about 1485 nm, about 1490 nm, about 1495 nm, 1500 nm, about 1505 nm, about 1510 nm, about 1515 nm, 1520 nm, about 1525 nm, about 1530 nm, or in a range between any two of the above pump wavelengths, inclusive; and wherein the signal wavelength is longer than the first wavelength (e.g., in various embodiments, the signal wavelength is about 1530 nm, about 1535 nm, about 1540 nm, about 1545 nm, 1550 nm, about 1555 nm, about 1560 nm, about 1565 nm, about 1570 nm, about 1575 nm, about 1580 nm, about 1585 nm, 1590 nm, about 1595 nm, about 1600 nm, about 1605 nm, 1610 nm, about 1615 nm, about 1620 nm, or in a range between any two of the above signal wavelengths, inclusive); and wherein the second wavelength is shorter than the first wavelength (e.g., in various embodiments, the second wavelength is about 780 nm, about 790 nm, about 800 nm, about 810 nm, 820 nm, about 830 nm, about 840 nm, about 850 nm, about 860 nm, about 870 nm, about 880 nm, about 890 nm, 900 nm, about 910 nm, 920 nm, about 930 nm, about 940 nm, about 950 nm, about 960 nm, about 970 nm, about 980 nm, about 990 nm, about 1000 nm, about 1020 nm, about 1030 nm, 1040 nm, about 1050 nm, about 1060 nm, about 1120 nm, or in a range between any two of the above signal wavelengths, inclusive).

In one preferred embodiment, the signal wavelength is about 1580 nm, the first pump wavelength is about 1530 nm, and the second pump wavelength is about 980 nm, and the active species in the gain fiber includes erbium.

In some embodiments of the method, the gain fiber is erbium doped, the signal wavelength is between 1520 nm and 1620 nm inclusive, the first wavelength is between 1470 nm and 1530 nm inclusive and the first wavelength is shorter than the signal wavelength, and the second wavelength is shorter than the first wavelength. In some embodiments, the second pump wavelength is between 960 nm and 999 nm inclusive. In some embodiments, the second pump wavelength is about 977 nm and the pump light having the second pump wavelength includes a laser diode. In some embodiments, the second pump wavelength is about 977 nm and the pump light having the second pump wavelength includes a plurality of laser diodes in a laser-diode bar.

In some embodiments, the present invention provides an apparatus that includes an optical structure that includes a gain fiber, wherein the optical structure includes a small-core fiber having a core of a first diameter and configured to provide combined seed-signal light and pump light having a first wavelength, a mode-field adaptor (MFA) configured to expand the diameter of the combined seed-signal light and pump light having the first pump wavelength and to mode match the expanded seed signal and pump light having the first pump wavelength to a fundamental mode of the gain fiber; and wherein the apparatus is configured to insert the pump light having the second pump wavelength into the inner cladding waveguide of the gain fiber, and wherein the small-core fiber is optically coupled to the MFA, the MFA is optically coupled to the gain fiber; wherein the apparatus is configured to amplify the seed signal in a first portion of the gain fiber using at least energy from the pump light having the first wavelength, and to further amplify the seed signal in a second portion of the gain fiber using energy from the pump light having the second wavelength to generate an amplified output signal beam. In some such embodiments, the first wavelength is the same as the second wavelength and is shorter than the signal wavelength. In other embodiments, the first wavelength is close to the signal wavelength (e.g., in some embodiments, the signal wavelength is longer than the first wavelength but no more than ten percent (10%) longer than the first wavelength, while in other embodiments, the signal wavelength is longer than the first wavelength but no more than fifteen percent (15%) longer than the first wavelength, while in yet other embodiments, the signal wavelength is longer than the first wavelength but no more than twenty percent (20%) longer than the first wavelength, while in still other embodiments, the signal wavelength is longer than the first wavelength but no more than five percent (5%) longer than the first wavelength).

In some embodiments, the present invention provides an apparatus that includes an optical structure that includes a gain fiber, wherein the optical structure includes a core waveguide, a inner cladding waveguide that surrounds the core waveguide, and an outer cladding that surrounds the inner cladding waveguide; a wavelength-division multiplexor (WDM) that includes a signal-input fiber configured to receive a seed signal, a pump-input fiber configured to receive optical pump light having a first pump wavelength and a WDM output fiber having a core waveguide, and wherein the WDM combines the seed signal and the pump light having the first pump wavelength and outputs the combined seed signal and pump light having the first wavelength in the core waveguide of the WDM output fiber; a mode-field adaptor (MFA) configured to expand of the combined seed signal and pump light having the first pump wavelength and to mode match the expanded seed signal and pump light having the first pump wavelength to a fundamental mode of the gain fiber; and a cladding-pump combiner (CPC) that includes a core-input fiber, a CPC output fiber and a plurality of pump-input fibers configured to receive pump light having a second pump wavelength, wherein the CPC is configured to insert the pump light having the second pump wavelength into the inner cladding waveguide of the optical structure, and wherein the WDM output fiber is optically coupled to the MFA, the MFA is optically coupled to the core-input fiber of the CPC, and the CPC output fiber is optically coupled to the gain fiber; wherein the apparatus is configured to amplify the seed signal in a first portion of the gain fiber using at least energy from the pump light having the first wavelength, and to further amplify the seed signal in a second portion of the gain fiber using energy from the pump light having the second wavelength to generate an amplified output signal beam.

Some embodiments of the apparatus further include a vehicle having an enclosure; an electrical power supply in the vehicle; a first pump source that generates the pump light having the first wavelength; a second pump source that generates the pump light having the second wavelength; a seed source that generates the seed signal; a control system operably coupled to the electrical power supply, the first pump source, the second pump source and the seed source, and configured to receive the electrical power and to control generation of the pump light having the first wavelength, generation of the pump light having the second wavelength and generation of seed signal; and an output-direction controller that controls a direction of the amplified output signal beam in one of a plurality of different possible directions relative to the vehicle.

Some embodiments of the apparatus further include a medical instrument having an enclosure; an electrical power supply operably connected to the medical instrument; a first pump source that generates the pump light having the first wavelength; a second pump source that generates the pump light having the second wavelength; a seed source that generates the seed signal; a control system operably coupled to the electrical power supply, the first pump source, the second pump source and the seed source, and configured to receive the electrical power and to control generation of the pump light having the first wavelength, generation of the pump light having the second wavelength and generation of seed signal; and an output-direction controller that controls a direction of the amplified output signal beam in one of a plurality of different possible directions relative to the medical instrument.

In some embodiments of the apparatus, the signal wavelength is longer that the first wavelength and is not more than ten percent (10%) of the first wavelength longer than the first wavelength, and wherein the second wavelength is shorter than the first wavelength.

In some embodiments, the gain fiber is erbium doped, the signal wavelength is between 1520 nm and 1620 nm inclusive, the first wavelength is between 1470 nm and 1530 nm inclusive and the first wavelength is shorter than the signal wavelength, and the second wavelength is shorter than the first wavelength.

In some embodiments, the mode-field adaptor is fused between a small-core input fiber at an input end and a large-core output fiber at an output end and includes a section of coreless fiber at the input end and a graded-index (GRIN) fiber at the output end.

In some embodiments, the present invention provides an apparatus that includes an optical structure that includes a gain fiber, wherein the optical structure includes a core waveguide, a inner cladding waveguide that surrounds the core waveguide, and an outer cladding that surrounds the inner cladding waveguide; means for receiving an optical seed signal having a signal wavelength; means for receiving optical pump light having a first pump wavelength; means for receiving optical pump light having a second pump wavelength; means for combining the received seed signal and the received pump light having the first pump wavelength into the core waveguide of the optical structure; means for inserting the pump light having the second pump wavelength into the inner cladding waveguide of the optical structure; means for amplifying the seed signal in a first portion of the gain fiber using at least energy from the pump light having the first wavelength; and means for further amplifying the seed signal in a second portion of the gain fiber using energy from the pump light having the second wavelength.

Some embodiments of the apparatus further include means for expanding the combined seed signal and pump light having the first pump wavelength and for mode matching the expanded seed signal and pump light to a fundamental mode of the gain fiber.

In some embodiments of the apparatus, the means for combining includes means for wavelength-division multiplexing the seed signal and the pump light having the first pump wavelength and means for outputting the combined seed signal and pump light having the first pump wavelength in the core waveguide; and the means for inserting the pump light having the second pump wavelength into the inner cladding waveguide includes means for receiving core light, means for outputting core light and cladding light, wherein the means for inserting the pump light having the second pump wavelength is operable coupled to the means for receiving the pump light having the second pump wavelength, and wherein the means for outputting core light and cladding light is fused to the means for expanding and for mode matching, the means for expanding and for mode matching is fused to the means for inserting the pump light having the second pump wavelength into the inner cladding waveguide, and the means for inserting the pump light having the second pump wavelength into the inner cladding waveguide is fused to the gain fiber.

Some embodiments of the apparatus further include a vehicle having an enclosure; an electrical power supply; means for generating the optical seed signal having the signal wavelength operably coupled to the means for receiving the optical seed signal having the signal wavelength; means for generating the optical pump light having the first pump wavelength operably coupled to means for receiving the optical pump light having the first pump wavelength; means for generating the optical pump light having the second pump wavelength operably coupled to means for receiving the optical pump light having the second pump wavelength; means for controlling and providing power from the power supply to the means for generating the optical seed signal, the means for generating the optical pump light having the first pump wavelength and the means for generating the optical pump light having the second pump wavelength; and means for controlling an output direction of the output beam in one of a plurality of different possible directions relative to the vehicle.

Some embodiments of the apparatus further include a medical instrument having an enclosure; an electrical power supply; means for generating the optical seed signal having the signal wavelength operably coupled to the means for receiving the optical seed signal having the signal wavelength; means for generating the optical pump light having the first pump wavelength operably coupled to means for receiving the optical pump light having the first pump wavelength; means for generating the optical pump light having the second pump wavelength operably coupled to means for receiving the optical pump light having the second pump wavelength; means for controlling and providing power from the power supply to the means for generating the optical seed signal, the means for generating the optical pump light having the first pump wavelength and the means for generating the optical pump light having the second pump wavelength; and means for controlling an output direction of the output beam in one of a plurality of different possible directions relative to the medical instrument.

In some embodiments, the signal wavelength is longer that the first wavelength and is not more than ten percent (10%) of the first wavelength longer than the first wavelength, and wherein the second wavelength is shorter than the first wavelength.

In some embodiments, the signal wavelength is longer that the first wavelength (i.e., the wavelength of the core-pump light) and is in a range of three to fifteen (3% to 15%) of the first wavelength longer than the first wavelength, and wherein the second wavelength (i.e., the wavelength of the cladding-pump light) is shorter than the first wavelength.

In some embodiments, the signal wavelength is longer that the first wavelength and is within the same energy-level multiplet of the rare-earth dopant as is the first wavelength, and wherein the second wavelength (i.e., the wavelength of the cladding-pump light) is shorter than the first wavelength (i.e., the wavelength of the core-pump light). In some such embodiments, the cladding-pump light has a wavelength that is not in the same energy-level multiplet of the rare-earth dopant as is the signal wavelength. In some such embodiments, the cladding pump light has a wavelength that is 80% or less than the signal wavelength (the shorter wavelength means that this cladding-pump light is absorbed into a different multiplet than the multiplet that amplifies the signal wavelength.

In some embodiments, the rare-earth dopant includes at least one element selected from the group consisting of the transition-metal elements (e.g., scandium, yttrium) and the rare-earth elements (i.e., the trivalent lanthanide ions of the group consisting of lanthanum, cerium, praseodymium, neodymium, promethium, samarium, europium, gadolinium, terbium, dysprosium, holmium, erbium, thulium, ytterbium, and lutetium).

In some embodiments, the glass used for the optical gain fiber includes oxide glasses (e.g., one or more selected from the group consisting of borate, germinate, phosphate, silica, silicate, aluminotsilicate, borosilicate, germanosilicate and tellurite glasses), halide glasses (e.g., one or more selected from the group consisting of fluoroberyllate and fluorozirconate glasses), oxyhalide glasses (e.g., one or more selected from the group consisting of fluoroaluminate and fluorophosphates glasses), and/or chalcogenide glasses (e.g., sulfide glasses).

In some embodiments, the gain fiber is erbium doped, the signal wavelength is between 1520 nm and 1620 nm inclusive, the first wavelength is between 1470 nm and 1530 nm inclusive and the first wavelength is shorter than the signal wavelength, and the second wavelength is shorter than the first wavelength.

In some embodiments, the core waveguide of the optical structure is doped with at least one rare-earth element, the signal wavelength is longer that the first wavelength, and the signal wavelength and first wavelength of the pump light both have energy levels in a single multiplet of the at least one rare-earth element.

Some embodiments of the apparatus further include a vehicle having an enclosure; an electrical power supply attached to the vehicle; a laser controller operatively coupled to receive electrical power from the electrical power supply and operably coupled to power and control the plurality of optical-fiber Raman lasers; and a beam-direction controller operably coupled to receive the single output beam from the spectral-beam combiner and operable to direct the single output beam in one of a plurality of different possible directions relative to the vehicle. It is to be understood that the above description is intended to be illustrative, and not restrictive.

Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are merely labels, and are not intended to impose numerical requirements on their objects.

What is claimed is:

1. A method comprising:
providing a gain fiber, wherein the gain fiber includes a core waveguide, an inner cladding waveguide that surrounds the core waveguide, and an outer cladding that surrounds the inner cladding waveguide;
inserting both an optical seed signal having a signal wavelength and pump light having a first pump wavelength into the core waveguide of the gain fiber;
inserting pump light having a second pump wavelength into the inner cladding waveguide of the gain fiber;
amplifying the seed signal in a first portion of the gain fiber using at least energy from the pump light having the first wavelength; and
further amplifying the seed signal in a second portion of the gain fiber using energy from the pump light having the second wavelength.

2. The method of claim 1, further comprising:
providing an optical structure optically coupled to the gain fiber, wherein the optical structure includes a core waveguide, an inner cladding waveguide that surrounds the core waveguide, and an outer cladding that surrounds the inner cladding waveguide;
receiving the optical seed signal having the signal wavelength;
receiving the pump light having the first pump wavelength;
combining the received seed signal and the received pump light having the first pump wavelength into the core waveguide of the optical structure;
in the optical structure, expanding the combined seed signal and pump light having the first pump wavelength and mode matching the expanded seed signal and pump light having the first pump wavelength to a fundamental mode of the gain fiber;
receiving the pump light having the second pump wavelength; and
inserting the pump light having the second pump wavelength into the inner cladding waveguide of the optical structure, wherein the inserting of the seed signal and the pump light having the first pump wavelength into the core waveguide of the gain fiber includes coupling the expanded and mode-matched seed signal and pump light having the first pump wavelength into the core of the gain fiber from the core of the optical structure, and wherein the inserting of the pump light having the second pump wavelength into the inner cladding waveguide of the gain fiber includes coupling the pump light having the second pump wavelength into the inner cladding of the gain fiber from the inner cladding of the optical structure.

3. The method of claim 2, wherein the providing of the optical structure includes:
providing a wavelength-division multiplexor (WDM) that includes a signal-input fiber for the receiving of the seed signal, a pump-input fiber for the receiving of the pump light having the first pump wavelength and a WDM output fiber, and wherein the WDM is used for the combining of the seed signal and the pump light having the first pump wavelength;
providing a mode-field adaptor (MFA) that is used for the expanding of the combined seed signal and pump light having the first pump wavelength and provides the mode matching of the expanded seed signal and pump light having the first pump wavelength to a fundamental mode of the gain fiber; and
providing a cladding-pump combiner (CPC) that includes a core-input fiber, a CPC output fiber and a plurality of pump-input fibers for the receiving of the pump light having the second pump wavelength, wherein the cladding-pump combiner provides the inserting of the pump light having the second pump wavelength into the inner cladding waveguide of the optical structure, and wherein the WDM output fiber is fused to the MFA, the MFA is fused to the core-input fiber of the CPC, and the CPC output fiber is fused to the gain fiber.

4. The method of claim 2, wherein at least a portion of the expanding of the combined seed signal and pump light having the first pump wavelength is done in a section of coreless fiber, and wherein at least a portion the mode matching of the expanded seed signal and pump light to the fundamental mode of the gain fiber is done using a section of graded-index (GRIN) fiber fused to the section of coreless fiber.

5. The method of claim 1, further comprising:
providing a vehicle having an enclosure;
supplying electrical power;
using the electrical power, controlling and providing power for generating the pump light having the first wavelength and for generating the pump light having the second wavelength; and
controlling an output direction of an output beam of the amplified seed signal in one of a plurality of different possible directions relative to the vehicle.

6. The method of claim 1, further comprising:
providing a medical instrument having an enclosure;
supplying electrical power;
using the electrical power, controlling and providing power for generating the pump light having the first wavelength and for generating the pump light having the second wavelength; and
controlling an output direction of an output beam of the amplified seed signal in one of a plurality of different possible directions relative to the medical instrument.

7. The method of claim 1, wherein the signal wavelength is longer than the first wavelength and is not more than ten percent (10%) of the first wavelength longer than the first wavelength, and wherein the second wavelength is shorter than the first wavelength.

8. The method of claim 1, wherein the gain fiber is erbium doped, the signal wavelength is between 1520 nm and 1620 nm inclusive, the first wavelength is between 1470 nm and 1530 nm inclusive and the first wavelength is shorter than the signal wavelength, and the second wavelength is shorter than the first wavelength.

9. The method of claim 1, wherein the gain fiber is doped with a rare-earth element, and the signal wavelength and first wavelength of the pump light both have energy levels in a single multiplet of the rare-earth element.

10. An apparatus comprising:
an optical structure that includes a gain fiber, wherein the optical structure includes a core waveguide, an inner cladding waveguide that surrounds the core waveguide, and an outer cladding that surrounds the inner cladding waveguide;
a wavelength-division multiplexor (WDM) that includes a signal-input fiber configured to receive a seed signal, a pump-input fiber configured to receive optical pump light having a first pump wavelength and a WDM output fiber having a core waveguide, and wherein the WDM combines the seed signal and the pump light having the first pump wavelength and outputs the combined seed signal and pump light having the first wavelength in the core waveguide of the WDM output fiber;
a mode-field adaptor (MFA) configured to expand of the combined seed signal and pump light having the first pump wavelength and to mode match the expanded seed signal and pump light having the first pump wavelength to a fundamental mode of the gain fiber; and
a cladding-pump combiner (CPC) that includes a core-input fiber, a CPC output fiber and a plurality of pump-input fibers configured to receive pump light having a second pump wavelength, wherein the CPC is configured to insert the pump light having the second pump wavelength into the inner cladding waveguide of the optical structure, and wherein the WDM output fiber is optically coupled to the MFA, the MFA is optically coupled to the core-input fiber of the CPC, and the CPC output fiber is optically coupled to the gain fiber;
wherein the apparatus is configured to amplify the seed signal in a first portion of the gain fiber using at least energy from the pump light having the first wavelength, and to further amplify the seed signal in a second portion of the gain fiber using energy from the pump light having the second wavelength to generate an amplified output signal beam.

11. The apparatus of claim 10, further comprising:
a vehicle having an enclosure;
an electrical power supply in the vehicle;
a first pump source that generates the pump light having the first wavelength;
a second pump source that generates the pump light having the second wavelength;
a seed source that generates the seed signal;
a control system operably coupled to the electrical power supply, the first pump source, the second pump source and the seed source, and configured to receive the electrical power and to control generation of the pump light having the first wavelength, generation of the pump light having the second wavelength and generation of seed signal; and
an output-direction controller that controls a direction of the amplified output signal beam in one of a plurality of different possible directions relative to the vehicle.

12. The apparatus of claim 10, further comprising:
a medical instrument having an enclosure;
an electrical power supply operably connected to the medical instrument;
a first pump source that generates the pump light having the first wavelength;
a second pump source that generates the pump light having the second wavelength;
a seed source that generates the seed signal;
a control system operably coupled to the electrical power supply, the first pump source, the second pump source and the seed source, and configured to receive the electrical power and to control generation of the pump light having the first wavelength, generation of the pump light having the second wavelength and generation of seed signal; and
an output-direction controller that controls a direction of the amplified output signal beam in one of a plurality of different possible directions relative to the medical instrument.

13. The apparatus of claim 10, wherein the signal wavelength is longer than the first wavelength and is not more than ten percent (10%) of the first wavelength longer than the first wavelength, and wherein the second wavelength is shorter than the first wavelength.

14. The apparatus of claim 10, wherein the gain fiber is erbium doped, the signal wavelength is between 1520 nm and 1620 nm inclusive, the first wavelength is between 1470 nm and 1530 nm inclusive and the first wavelength is shorter than the signal wavelength, and the second wavelength is shorter than the first wavelength.

15. The apparatus of claim 10, wherein the mode-field adaptor is fused between a small-core input fiber at an input end and a large-core output fiber at an output end and includes a section of coreless fiber at the input end and a graded-index (GRIN) fiber at the output end.

16. An apparatus comprising:
an optical structure that includes a gain fiber, wherein the optical structure includes a core waveguide, an inner cladding waveguide that surrounds the core waveguide, and an outer cladding that surrounds the inner cladding waveguide;
means for receiving an optical seed signal having a signal wavelength;
means for receiving optical pump light having a first pump wavelength;
means for receiving optical pump light having a second pump wavelength;
means for combining the received seed signal and the received pump light having the first pump wavelength into the core waveguide of the optical structure;
means for inserting the pump light having the second pump wavelength into the inner cladding waveguide of the optical structure;
means for amplifying the seed signal in a first portion of the gain fiber using at least energy from the pump light having the first wavelength; and
means for further amplifying the seed signal in a second portion of the gain fiber using energy from the pump light having the second wavelength.

17. The apparatus of claim 16, further comprising means for expanding the combined seed signal and pump light having the first pump wavelength and for mode matching the expanded seed signal and pump light having the first pump wavelength to a fundamental mode of the gain fiber.

18. The apparatus of claim 17,
wherein the means for combining includes means for wavelength-division multiplexing the seed signal and the pump light having the first pump wavelength and means for outputting the combined seed signal and pump light having the first pump wavelength in the core waveguide,
wherein the means for inserting the pump light having the second pump wavelength into the inner cladding waveguide includes means for receiving core light and means for outputting core light and cladding light,
wherein the means for inserting the pump light having the second pump wavelength is operable operably coupled to the means for receiving the pump light having the second pump wavelength,
wherein the means for outputting the combined seed signal and pump light is fused to the means for expanding and for mode matching,
wherein the means for expanding and for mode matching is fused to the means for inserting the pump light having the second pump wavelength into the inner cladding waveguide, and
wherein the means for inserting the pump light having the second pump wavelength into the inner cladding waveguide is fused to the gain fiber.

19. The apparatus of claim 16, further comprising:
a vehicle having an enclosure;
an electrical power supply;
means for generating the optical seed signal having the signal wavelength operably coupled to the means for receiving the optical seed signal having the signal wavelength;
means for generating the optical pump light having the first pump wavelength operably coupled to the means for receiving the optical pump light having the first pump wavelength;
means for generating the optical pump light having the second pump wavelength operably coupled to the means for receiving the optical pump light having the second pump wavelength;
means for controlling and providing power from the power supply to the means for generating the optical seed signal, the means for generating the optical pump light having the first pump wavelength, and the means for generating the optical pump light having the second pump wavelength; and means for controlling an output direction of an output beam of the amplified seed signal in one of a plurality of different possible directions relative to the vehicle.

20. The apparatus of claim 16, further comprising:
a medical instrument having an enclosure;
an electrical power supply;
means for generating the optical seed signal having the signal wavelength operably coupled to the means for receiving the optical seed signal having the signal wavelength;
means for generating the optical pump light having the first pump wavelength operably coupled to the means for receiving the optical pump light having the first pump wavelength;
means for generating the optical pump light having the second pump wavelength operably coupled to the means for receiving the optical pump light having the second pump wavelength;
means for controlling and providing power from the power supply to the means for generating the optical seed signal, the means for generating the optical pump light having the first pump wavelength, and the means for generating the optical pump light having the second pump wavelength; and
means for controlling an output direction of an output beam of the amplified seed signal in one of a plurality of different possible directions relative to the medical instrument.

21. The apparatus of claim 17,
wherein the means for combining includes means for wavelength-division multiplexing the seed signal and the pump light having the first pump wavelength and means for outputting the combined seed signal and pump light having the first pump wavelength in the core waveguide,
wherein the means for inserting the pump light having the second pump wavelength into the inner cladding waveguide includes means for receiving core light and means for outputting core light and cladding light,
wherein the means for inserting the pump light having the second pump wavelength is operably coupled to the means for receiving the pump light having the second pump wavelength,
wherein the means for outputting the combined seed signal and pump light is fused to the means for inserting the pump light having the second pump wavelength into the inner cladding waveguide,
wherein the means for inserting the pump light having the second pump wavelength into the inner cladding waveguide is fused to the means for expanding and for mode matching, and
wherein the means for expanding and for mode matching is fused to the gain fiber.

* * * * *